United States Patent [19]
Watanabe

[11] Patent Number: 6,160,942
[45] Date of Patent: *Dec. 12, 2000

[54] OPTICAL FIBER COMMUNICATION SYSTEM USING OPTICAL PHASE CONJUGATION

[75] Inventor: Shigeki Watanabe, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/300,237

[22] Filed: Apr. 27, 1999

Related U.S. Application Data

[63] Continuation of application No. 08/979,417, Nov. 26, 1997, abandoned.

[30] Foreign Application Priority Data

Oct. 20, 1994 [JP] Japan ..................................... 6-255849
Mar. 3, 1995 [JP] Japan ..................................... 7-044574

[51] Int. Cl.$^7$ .............................. G02B 6/00; H04J 14/00
[52] U.S. Cl. ............................. 385/122; 385/15; 385/24; 385/42; 385/123; 385/141; 359/115; 359/124; 359/127
[58] Field of Search .................................. 385/15, 24, 5, 385/11, 31, 42, 123, 124, 122, 141, 142, 144, 147; 359/115, 124, 127, 134

[56] References Cited

U.S. PATENT DOCUMENTS

| | | | |
|---|---|---|---|
| 5,365,362 | 11/1994 | Gnauck et al. | 359/174 |
| 5,386,314 | 1/1995 | Jopson | 359/326 |
| 5,400,164 | 3/1995 | Kurtzke et al. | 359/156 |
| 5,400,165 | 3/1995 | Gnauck et al. | 319/161 |
| 5,596,667 | 1/1997 | Watanabe | 385/122 |
| 5,798,853 | 8/1998 | Watanabe | 359/160 |

FOREIGN PATENT DOCUMENTS

| | | | |
|---|---|---|---|
| 53-61290 | 6/1978 | Japan | 385/122 X |
| 60-142582 | 7/1985 | Japan | 372/43 X |

*Primary Examiner*—Brian Healy
*Attorney, Agent, or Firm*—Helfgott & Karas, P.C.

[57] ABSTRACT

Optical phase conjugation is applied to an optical fiber communication system. The system comprises a transmitter for outputting signal light, a phase conjugator, a receiver, a first single mode fiber laid between the transmitter and the phase conjugator, and a second single mode fiber laid between the phase conjugator and the receiver, wherein parameters such as signal light frequencies in the fibers are set adequately. This system is capable of compensating for any waveform distortion derived from chromatic dispersion and optical Kerr effect.

36 Claims, 22 Drawing Sheets

OPTICAL FIBER COMMUNICATION SYSTEM USING OPTICAL PHASE CONJUGATION

This application is a continuation of Ser. No. 08/979,417 filed Nov. 26, 1997 now abandoned.

BACKGROUND OF THE INVENTION

1. Field of the Invention

The present invention relates to an optical fiber communication system using optical phase conjugation.

2. Description of the Related Art

By the application of nonlinear optics, it becomes possible to achieve new functions and improved characteristics unrealizable heretofore in the conventional optical technology. Particularly the use of optical phase conjugation enables compensation for phase distortion or chromatic dispersion in a transmission line. In Japanese Patent Application No. Hei 5(1993)-221856 (Optical Communication System with Compensation for Chromatic Dispersion, and Phase Conjugate Light Generator Applicable to Such System), there are already described a method which, by the application of the above characteristics to an optical fiber communication system, compensates for distortion of high speed optical pulses derived from group-velocity dispersion (GVD) in a fiber or nonlinear optical Kerr-effect, and also application of the method to wavelength-division multiplexed (WDM) optical transmission.

The conventional optical communication system is constructed by employment of optical components having linear optical characteristics, so that some limits are existent with respect to the characteristics and the functions though the construction is simple. In the field of the latest optical fiber communication system, there are practically realized a non-repeating system and a multistage optical amplifiers repeating system covering a long distance of several hundred to several thousand kilometers, and the transmission speed thereof is as high as several Gb/sec to 10 Gb/sec or more. Out of many existing problems to be solved in such systems, the most important and serious one is harmful influence of GVD in a fiber. In any of the systems mentioned above, the transmission characteristics are deteriorated by the influence derived from GVD and so forth to consequently induce restrictions on both the transmission speed and the transmission distance.

The principal countermeasure adopted in the prior art against GVD is based fundamentally on an idea to minimize the dispersion of the fiber itself. In the fiber realized as a result of the development, the dispersion is reduced to zero at transmission center wavelengths of 1.3 $\mu$m and/or 1.55 $\mu$m. Study of an optical modulator which generates signals less affected by GVD is also in progress, and a novel modulator using $LiNbO_3$ is currently developed. Further advanced study is presently in progress with regard to a method of compensating for GVD in a transmission line by previously giving inverse chirping to transmission signal light or a method of carrying out compensation for dispersion either optically or electrically in a receiver. Thus, regarding the countermeasures against GVD, continuous researches and studies are advanced with respect to the entirety of transmitters, transmission lines and receivers due to reflection of such serious problems.

When signal light is composed of an optical pulse (inclusive of a pulse train consisting of a plurality of optical pulses) processed through intensity modulation or amplitude modulation, there may occur a phenomenon that the pulse waveform is distorted by some other reasons than GVD. Notable ones are assumed to be as follows:

(1) Waveform distortion caused by GVD and optical Kerr effect (2) Waveform distortion caused by random phase fluctuation derived from accumulation of ASE (amplified spontaneous emission) noise of optical amplifier in a multistage optical amplifiers repeating transmission Of the above two items, it is intended in the present invention to deal particularly with the waveform distortion in the item (1).

Suppose now that an optical pulse propagates in a dispersion medium. When an unchirped pulse passes through a normal dispersion medium ($\partial^2\beta/\partial\omega^2 > 0$), the pulse is shifted toward a lower frequency side at its leading edge or is shifted toward a higher frequency side at its trailing edge. Meanwhile in the case of an anomalous dispersion medium ($\partial^2\beta/\partial\omega^2 < 0$), the pulse is shifted toward a higher frequency side at its leading edge or is shifted toward a lower frequency side at its trailing edge. In the above, $\beta$ and $\omega$ denote the propagation constant and the angular frequency of the light, respectively. In a normal dispersion medium, the longer the wavelength, the faster the group velocity; whereas in an anomalous dispersion medium, the shorter the wavelength, the faster the group velocity. In either case, therefore, the pulse width is increased.

When the light intensity is great, the refractive index is changed by the following value due to the optical Kerr effect.

$$\Delta n(t) = n_2 |E(t)|^2 \qquad (1)$$

In the above equation, $n_2$ is the amount termed nonlinear refractive index, and its value in the case of a silica fiber is approximately $3.2 \times 10^{-20} m^2/W$. When an optical pulse is affected by the optical Kerr effect in a nonlinear medium, the spectrum is chirped as following.

$$\Delta\omega(t) = -\frac{\partial \Delta\phi(t)}{\partial t} = -\frac{2\pi n_2}{\lambda} \frac{\partial |E(t)|^2}{\partial t} \Delta z \qquad (2)$$

In the above equation, $\Delta z$ denotes the interaction length. This phenomenon is generally termed self-phase modulation (SPM). Due to this SPM, the optical pulse is shifted to a lower frequency side at its leading edge or is shifted toward a higher frequency side at its trailing edge. Because of the chirping caused by such SPM, the influence of the dispersion is rendered more noticeable to consequently increase the pulse distortion. Therefore, where the optical pulse is affected by the optical Kerr effect in a normal dispersion medium, the pulse is more broadened than in the case of dispersion alone; whereas in an anomalous dispersion medium, there occurs pulse compression. Accordingly, in considering the aforementioned effect of GVD as well, great pulse broadening occurs in a normal dispersion medium, whereas there appears, in an anomalous dispersion medium, either greater one of the pulse broadening derived from GVD and the pulse compression derived from SPM. An optical solution is obtained by balancing such two effects.

It is generally prone to be believed that, in an anomalous dispersion medium, a high signal-to-noise ratio can be advantageously retained by applying pulse compression derived from SPM. However, owing to the latest technique that enables satisfactory transmission with a high-level optical power by the use of a light amplifier and further realizes relatively small value of GVD due to development of dispersion-shifted fiber, it is not exactly certain now that application of pulse compression brings about a better result. In other words, a large waveform distortion is generated as the pulse compression effect is rendered excessive. Particularly in the case of NRZ pulses, concentrative pulse compression occurs at leading and trailing edges of the pulses, so that sharp waveform changes are induced and, in an extreme case, a fall portion passes a rise portion to eventually cause a phenomenon that one pulse is split into three. Meanwhile in long-distance light-amplified multi-repeating transmission, there exists a problem that four-wave mixing (FWM) is caused among the signal light, which acts as pump light, and spontaneous emission light from the light amplifier, hence exerting tremendous influence.

SUMMARY OF THE INVENTION

It is therefore an object of the present invention to provide an optical fiber communication system which is capable of suppressing the waveform distortion derived from the chromatic dispersion and optical Kerr effect.

According to one aspect of the present invention, there is provided an optical fiber communication system which comprises a first optical fiber for transmitting signal light therethrough; a phase conjugator for generating, in response to the signal light supplied from the first optical fiber, phase conjugate light corresponding to the signal light; and a second optical fiber for transmitting the phase conjugate light supplied thereto from the phase conjugator; wherein, when the first and second optical fibers are virtually divided into the same number of sections respectively, the average values of the GVDs of the relevant sections which, out of the entire divided sections, correspond to each other as counted consecutively from the phase conjugator, are so set as to have the same sign and the value approximately in inverse proportion to the length of each divided section, and the average value of the product of the optical frequency, the signal light intensity and the nonlinear refractive index in each divided section is so set as to be approximately in inverse proportion to the length of each divided section.

According to another aspect of the present invention, there is provided an optical fiber communication system which comprises a first optical fiber for transmitting signal light therethrough; a phase conjugator for generating, in response to the signal light supplied from the first optical fiber, phase conjugate light corresponding to the signal light; and a second optical fiber for transmitting the phase conjugate light supplied thereto from the phase conjugator; wherein the total GVD in the first optical fiber is approximately equal to the total GVD in the second optical fiber, and when at least one of the first and second optical fibers is virtually divided into a plurality of sections, the product of the optical frequency, the average signal light intensity, the nonlinear refractive index and the reciprocal of the average GVD in each of the sections is substantially fixed.

In the present invention where the optical fiber communication system is so constituted as mentioned above, it is possible to attain a novel function which is capable of compensating for the waveform distortion derived from the synergism of GVD and optical Kerr effect. In order to apply the invention to a high speed system, the optical fiber in the following description is defined as a single mode fiber.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Hereinafter some preferred embodiments of the present invention will be described in detail with reference to the accompanying drawings.

Figure 1:
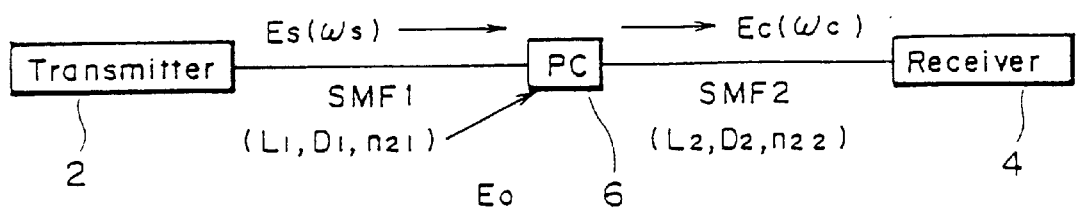
FIG. 1 is a diagram showing the fundamental constitution of the present invention.

FIG. 1 is a schematic diagram showing a fundamental constitution of the optical fiber communication system according to the present invention. A transmitter 2 generates signal light by performing modulation on the basis of transmission data. The signal light Es thus produced is transmitted as probe light through a first optical fiber SML1 (length $L_1$, dispersion $D_1$, nonlinear refractive index $n_{21}$) and then is inputted to a phase conjugator (PC) 6 disposed in the middle of an entire transmission line. In the phase conjugator 6, the signal light Es is transformed into phase conjugate light Ec by the use of pump light Eo and is transmitted to a receiver 4 through a second optical fiber SMF2 (length $L_2$, dispersion $D_2$, nonlinear refractive index $n_{22}$). The receiver 4 receives the phase conjugate light by its photo detector and detects the signal. Such signal detection is performed through, e.g., optical heterodyne detection or direct detection after extraction of the phase conjugate light via a band pass filter, whereby the transmission data is reproduced.

The optical fiber employed here is a silica fiber for example, and typical one is a 1.3 μm zero dispersion fiber or a 1.55 μm dispersion shifted fiber employed generally in light communication. The signal light may be one produced by wavelength-division-multiplexing a plurality of signal light outputs obtained from a plurality of signal sources of mutually different wavelength. The phase conjugator 6 has a second-order or third-order nonlinear optical medium and a means for supplying signal light and pump light to such a medium. Phase conjugate light is generated by parametric effect in the case of using a second-order nonlinear optical medium, or by degenerate or nondegenerate four-wave mixing (FWM) in the case of using a third-order nonlinear optical medium. The third-order nonlinear optical medium may be composed of a silica optical fiber for example, and it is possible in this case to generate satisfactory phase conjugate light by selectively presetting the pump light wavelength in FWM approximately to the zero dispersion wavelength of the optical fiber (as disclosed in Japanese Patent Application Hei 5 (1993)-221856).

Figure 2:
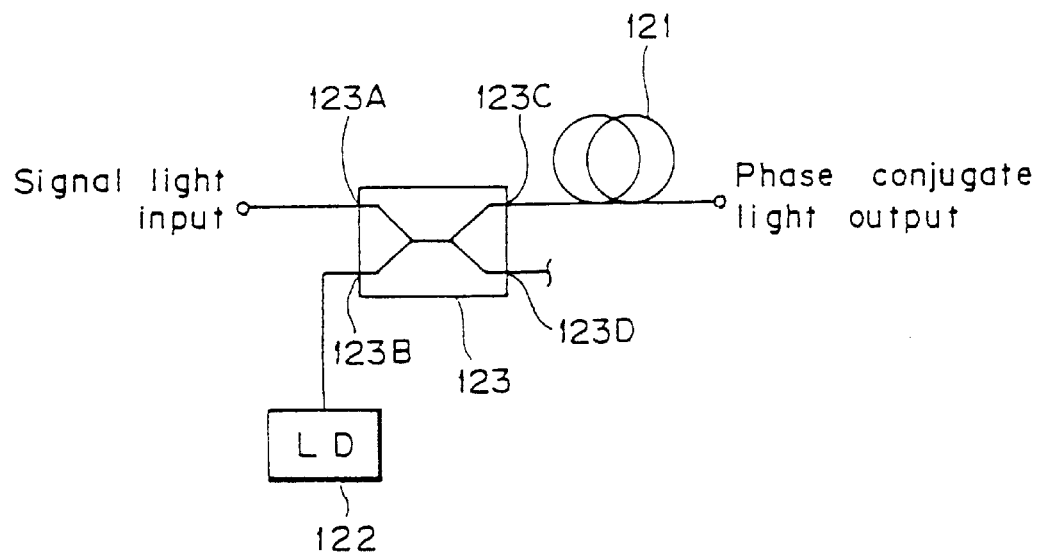
FIG. 2 is a block diagram showing an exemplary phase conjugator.

FIG. 2 is a block diagram of an exemplary phase conjugator. This phase conjugator comprises an optical fiber 121 as a nonlinear optical medium, a laser diode 122 as a pump light source, and an optical coupler 123 as an optical means for supplying a combination of the signal light and the pump light to the optical fiber 121. Preferably the optical fiber 121 is a single mode fiber. In this case, for execution of nondegenerate FWM by determining the wavelength of the signal light and that of the pump light to be slightly different from each other, it is so prearranged that the wavelength for giving zero dispersion of the optical fiber 121 becomes coincident with the pump light wavelength (oscillation wavelength of the laser diode 122). The optical coupler 123 has four ports 123A, 123B, 123C and 123D. To the port 123A is connected the first optical fiber SMF1 shown in FIG. 1; to the port 123B is connected the laser diode 122; to the port 123C is connected the first end of the optical fiber 121; and the port 123D is a dead end. Meanwhile the second end of the optical fiber 121 is connected to the second optical fiber SMF2 in FIG. 1.

In this specification, the term "connection" signifies operative connection inclusive of optical direct connection and also connection via any optical element such as an optical filter or an optical isolator, and further includes connection after proper adjustment of polarization. The optical coupler 123 so functions as to output from the port 123C the light supplied to the ports 123A and 123B. This optical coupler 123 may be of fiber fused type or may consist of a half mirror, a wavelength-division multiplexer or a polarized beam splitter. According to the constitution mentioned above, it is possible to combine the signal light, which is supplied to the port 123A of the optical coupler 123, with the pump light supplied to the port 123B thereof, and then to supply the combined light to the optical fiber 121 which is a nonlinear optical medium, hence realizing conversion of the signal light into the phase conjugate light by four-light mixing.

Figure 3:
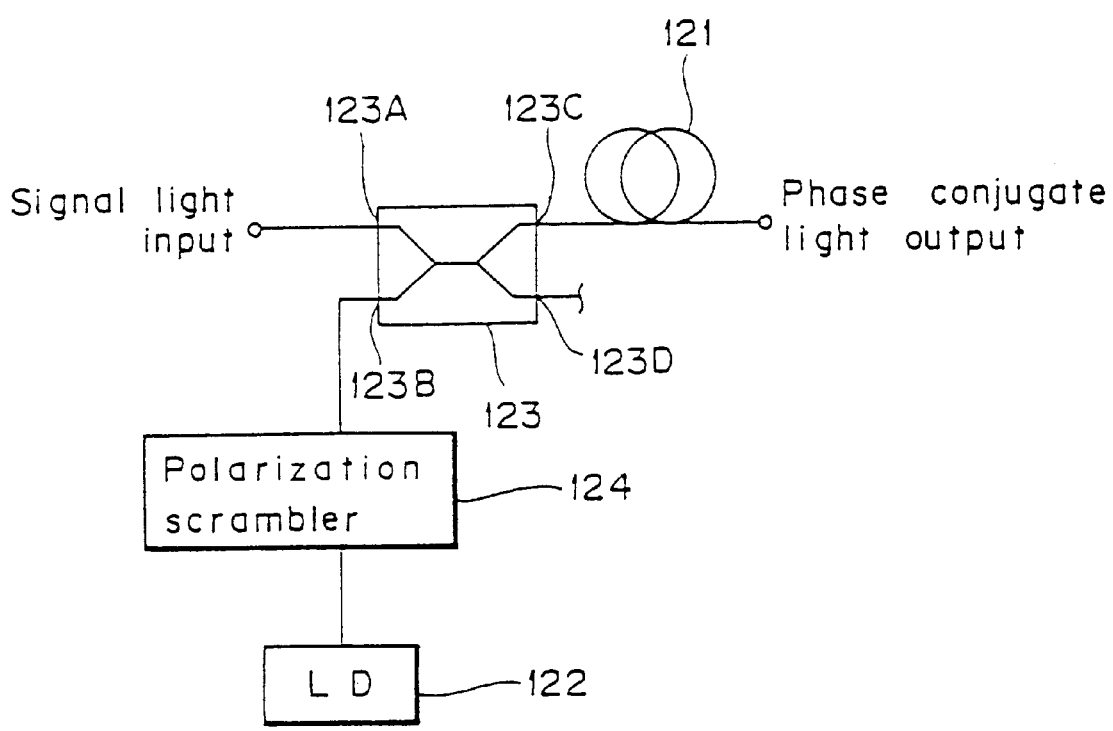
FIG. 3 is a block diagram showing another exemplary phase conjugator.

FIG. 3 is a block diagram of another exemplary phase conjugator. In comparison with the foregoing example of FIG. 2, this phase conjugator is characterized by the provision of a polarization scrambler 124 disposed between a laser diode 122 and a port 123B of an optical coupler 123. Generally in a single mode fiber, there exist two polarization modes where the planes of polarization are orthogonal to each other, and as a result of the coupling of such two polarization modes due to the influence of various external disturbances, the polarization state of the light supplied to the first end of the fiber fails to coincide with the polarization state of the light outputted from the second end of the fiber. Therefore, when a single mode fiber is employed for a transmission line as in this embodiment, the polarized state of the signal light supplied to the phase conjugator is varied with the lapse of time by environmental changes and so forth. The efficiency of conversion from the signal light into the phase conjugate light in the phase conjugator is dependent on the relationship between the polarized state of the signal light and that of the pump light supplied to the phase conjugator.

According to the example of FIG. 3, the pump light outputted from the laser diode 122 is joined to the signal light via the polarization scrambler 124, so that even if the polarization state of the supplied signal light is varied with the lapse of time, it is still possible to realize stable operations of various optical devices. The polarization scrambler 124 has a known ordinary construction including a combination of a ½ wavelength plate and a ¼ wavelength plate, a LiNbO$_3$ phase modulator and so forth, and when the pump light outputted from the laser diode 122 is substantially linear polarized one for example, the scrambler 124 so functions as to randamize the state of polarization thereof. In the example of FIG. 3, the polarization scrambler 124 is connected to act on the pump light outputted from the laser diode 122. The constitution may be so modified that the scrambler is disposed between the port 123A of the optical coupler 123 and the first optical fiber SMF1 shown in FIG. 1 or is incorporated in the transmitter in such a manner as act on the signal light.

Now the principle of the present invention will be described below. Propagation of the signal light E(x,y,z,t)=F(x,y) φ(z,t) exp [i(ωt−kz) ] in optical fiber transmission car generally be described by the following nonlinear wave equation, where F(x,y) denotes the transverse mode distribution, and φ(z,t) denotes the complex envelope of the light. It is assumed here that φ(z,t) is changed sufficiently slowly in comparison with the frequency of the light.

$$i\frac{\partial \phi}{\partial z} - (1/2)\beta_z \frac{\partial^2 \phi}{\partial T^2} + \gamma|\phi|^2\phi = -(i/2)\alpha\phi \qquad (3)$$

In the above: $T=t-\beta_1 z$ (where $\beta_1$ is propagation constant); $\alpha$ stands for the loss of the fiber; $\beta_2$ for the GVD of the fiber; and $$\gamma = \frac{\omega n_2}{cA_{\textit{eff}}} \qquad (4)$$

denotes the coefficient of the optical Kerr effect in the fiber. In this equation, $n_2$ and $A_{\textit{eff}}$ stand for the nonlinear refractive index of the fiber and the effective core area thereof respectively, and c stands for the light velocity in a vacuum. In this example, merely the first-order dispersion is taken into consideration, and any higher-order dispersion is omitted. Further, $\alpha(z)$, $\beta_2(z)$, $\gamma(Z)$, are functions of z. Here, the following normalized amplitude function $u(z,T)$ is introduced.

$$\phi(z, T) = A(z)u(z, T) \qquad (5)$$

In the above, $$A(z) \equiv A(0)\exp\left[-(1/2)\int_0^z \alpha(z)dz\right] \qquad (6)$$

denotes the amplitude, where one case of $\alpha(z)>0$ signifies that the transmission line has a loss, and the other case of $\alpha(z)<0$ signifies that the transmission line has a gain. Meanwhile $A(z) \equiv A(0)$ signifies that there is no loss. $A(z)^2 = P(z)$ corresponds to the optical power. Substituting Eqs. (5) and (6) for Eq. (3), the following equation of evolution is obtained.

$$i\frac{\partial u}{\partial z} = (1/2)\beta_z(z)\frac{\partial^2 u}{\partial T^2} - \gamma(z)A(z)^2|u|^2 u \qquad (7)$$

Then the following transformation is executed.

$$d\xi = |\beta_2(z)|dz \qquad (8)$$

As a result, Ea. (7) is transformed as follows.

$$i\frac{\partial u}{\partial \xi} = \frac{sgn[\beta_z]}{2}\frac{\partial^2 u}{\partial T^2} - \frac{\gamma(z)A(z)^2}{|\beta_2(z)|}|u|^2 u \qquad (9)$$

In the above, $sgn[\beta_2] = \pm 1$ takes a value +1 when $\beta_2 > 0$ signifying normal dispersion, or takes a value −1 when $\beta_2 > 0$ signifying anomalous dispersion. If Eq. (9) is established, the complex conjugate thereof is also established, so that the following equation is obtained.

$$-i\frac{\partial u^z}{\partial \xi} = \frac{sgn[\beta_2]}{2}\frac{\partial^2 u^z}{\partial T^2} - \frac{\gamma(z)A(z)^2}{|\beta_2(z)|}|u^z|^2 u^{\pm} \qquad (10)$$

The complex conjugate light u* conforms to the same equation of evolution as the equation for u. However, the direction of propagation is reverse. This is exactly the operation of the phase conjugator. In the transmission type phase conjugator, the phase shift by GVD and SPM is inverted.

Figure 4:
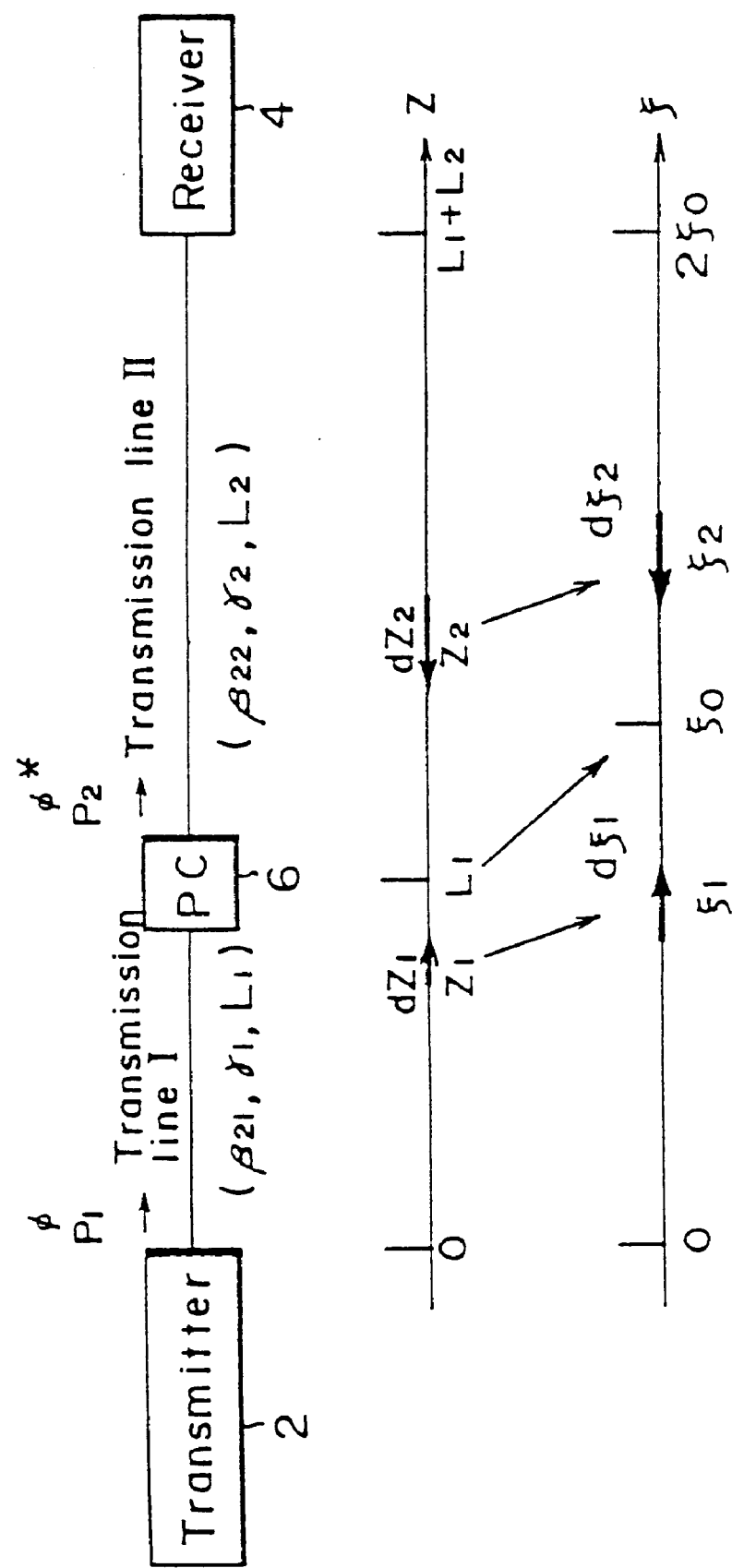
FIG. 4 is an explanatory diagram for the principle of the present invention.

Now the system shown in FIG. 4 will be discussed below. In long distance transmission, the transmission line loss is compensated for by repeating with light amplification. A phase conjugator is disposed between a transmission line I (length $L_1$) and a transmission line II (length $L_2$). Here the losses, dispersions and nonlinear coefficients of the two transmission lines are denoted respectively by $\alpha_j$, $\beta_{2j}$ and $\gamma_j$ (where j=1, 2).

In normalized coordinates ($\xi$ axis), the phase conjugator is disposed at a middle point $\xi = \xi_0$, and the receiver is disposed at a point $\xi = 2\xi_0$. In the transmission line I($0<\xi<\xi_0$), $u(\xi)$ obeys evolution equation (9). Then $u(\xi_0)$ is transformed into the light $u^*(\epsilon_0)$ by the phase conjugator, and $u^*(\xi)$ propagates in the transmission line II ($\xi_0 < \xi < 2\xi_0$) obeying evolution equation (10).

At this time, if only the parameter values are so set that the coefficients of the first and second terms on the right side of Eq. (9) and (10) are equalized to each other within the normalized distances $d\xi 1$ and $d\xi 2$ at arbitrary two points $\xi 1$ and $\xi 2$ ($=2\xi_0 - \xi_1$) which are symmetrical with respect to the position of the phase conjugator on the $\xi$ axis, then u* at the point $\xi 2$ becomes phase conjugate light of u at the point $\xi 1$. That is, the following two equations are the required conditions.

$$sgn[\beta_{21}(d\xi_1)] = sgn[\beta_{22}(d\xi_2)], \qquad (11)$$

$$\frac{\gamma_1(\xi_1)A_1(\xi_1)^2}{|\beta_{21}(\xi_1)|} = \frac{\gamma_2(\xi_2)A_2(\xi_2)^2}{|\beta_{22}(\xi_2)|} \qquad (12)$$

Eq. (11) represents the requisite that the signs of dispersions in the two transmission lines I and II need to be equal to each other, and this requisite is coincident with the dispersion compensating condition. Considering that $\gamma > 0$ and $A(z)^2 > 0$ in the fiber, the above condition can be rewritten as follows.

$$\frac{\gamma_1(\xi_1)A_1(\xi_1)^2}{\beta_{21}(\xi_1)} = \frac{\gamma^2(\xi_2)A_2(\xi_2)^2}{\beta_{22}(\xi_2)} \qquad (13)$$

The sign of the phase shift by GVD and SPM at the point $\xi_1$ in the transmission line I is inverted by the phase conjugator. Consequently, the waveform distortion derived from this phase shift at the point $\xi_1$ is compensated for by the distortion derived from the phase shift at the point $\xi 2$ in the transmission line II. Thus, whole compensation over the entire length can be attained by repeating, in each of the small sections, the partial compensation based on the above setting.

Next the above compensating condition will be described below with the z-coordinates. From Ea. (13), there is obtained $$\frac{\gamma_1(z_1)A_1(z_1)^2}{\beta_{21}(z_1)} = \frac{\gamma_2(z_2)A_2(z_2)^2}{\beta_{22}(z_2)} \qquad (14)$$

Namely, the requisite condition is such that, in each of the sections, the ratio of the GVD to the product of the nonlinear constant and the optical power is the same. In an exemplary case where such condition is satisfied, both of Eqs. (15) and (16) are established simultaneously.

$$\beta_{21}(z_1)\,dz_1 = -\beta_{22}(z_2)\,dz_2 \qquad (15)$$

$$\gamma_1(z_1)\,A_1(z_1)^2\,dz_1 = -\gamma_2(z_2)\,A_2(z_2)^2\,dz_2 \qquad (16)$$

In the above, $z_1$ and $Z_2$ are defined as follows.

$$\int_{LI}^{ZI} |\beta_{21}(z)| dz = -\int_{LI}^{Z2} |\beta_{22}(z)| dz \quad (17)$$

The section length dz is in inverse proportion to the intra-section dispersion or to the product of the nonlinear constant and the optical power. Here, considering the relationship between $\beta_2$ and D, i.e., $D=-(2\pi c/\lambda^2)\beta_2$, the following relationship can be obtained from Eqs. (15) and (16).

$$D_1 z_1) dz_1 = -D_2 (z_2) dz_2 \quad (18)$$

$$\gamma_1 (z_1) P_1 (z_1) dz_1 = -\gamma_2 (z_2) P_2 (z_2) dz_2 \quad (19)$$

It is seen that, regarding both the dispersion and the nonlinear effect, the compensating condition is that the increment at one of the two positions symmetrical with respect to the phase conjugator is equal to the decrement at the other position.

Eqs. (18) and (19) represent the requisites for compensation and signify that the total amount of the dispersion and the total amount of the optical Kerr effect in each small section are equal to those in the corresponding small section. Considering here that Eq. (4) and $I=P/A_{eff}$ represent the light intensity, the above equations signify that the desired compensation can be achieved if the product of the dispersion value, the nonlinear refractive index and the light intensity in each small section of the transmission lines I and II is set to be in inverse proportion to the length of the section and also if the ratio thereof is set to be equalized. Particularly when $\alpha$, D and $\gamma$ are fixed, the following equations can be obtained by integrating Eqs. (18) and (19).

$$D_1 L_1 = D_2 L_2 \quad (20)$$

$$_1 P_1 L_1 = \gamma_2 P_2 L_2 \quad (21)$$

In the above, $P_1 = P_1(0) [1-\exp(-\alpha_1 L_1)]/\alpha_1 L_1$ and $P_2 = P_2(L_1) [1-\exp(-\alpha_2 L_2)]/\alpha_2 L_2$ denote the average powers in the transmission lines I and II, respectively. These are coincident with the conditions in the method of SPM compensation based on the dispersion compensation and the average value approximation.

Now a method of substantially compensating for the fiber loss and amplifier gain will be described below. First, there is a means of using, as a transmission line, a medium with a distributed gain. For example, there may be employed a Raman amplifier or a doped fiber amplifier which is rarely doped with $Er^{3+}$ ions. In the present invention, the ratio of the optical Kerr effect to the dispersion value is controlled. Therefore, complete compensation can be realized by giving, at the positions equivalently symmetrical with respect to the phase conjugator, the same ratio of the optical Kerr effect to the dispersion. An increase of this ratio along the transmission line can be attained by gradually decreasing the dispersion or gradually increasing the optical Kerr effect. It is possible to change the dispersion value by adequately designing the fiber. For example, the above ratio is changeable by changing the zero dispersion wavelength of a dispersion shifted fiber (DSF) or by changing the specific refractive index difference between the core and the clad of the fiber or the core diameter thereof.

Meanwhile, change of the optical Kerr effect can be achieved by changing the nonlinear refractive index or the light intensity. Consequently, an optical fiber applicable to the present invention can be manufactured by continuously changing at least one fiber parameter selected from the loss, nonlinear refractive index, mode field diameter and dispersion. Here, a description will be given with regard to a method of changing the light intensity. For instance, an increase of the light intensity along a transmission line having some loss can be attained by gradually decreasing the effective core area $A_{eff}$. In case the mode field diameter (MFD) is reduced to a half for example, the light intensity is increased approximately four times. Although the MFD needs to be further reduced if the loss is greater, any excessive reduction of the MFD causes an increase of the loss on the contrary to consequently fail in achieving satisfactory effect. The minimum value of the MFD effective in practical use is at most 2 to 3 $\mu$m. Considering that the MFD of a 1.3 $\mu$m zero dispersion SMF is about 10 $\mu$m and the MFD of a 1.55 $\mu$m DSF is about 8 $\mu$m, it follows that the loss compensable merely by the MFD alone is about 10–14 dB compared with the SMF or about 8–12 dB compared with the DSF. Even when any further greater loss is existent, the present invention may be carried out by combining the effect of reducing the core diameter with the effect of decreasing the dispersion value. For example, even in case a further loss of 3 dB is existent, the requisite in Eq. (14) is realizable if the dispersion value can be halved.

Figure 5:
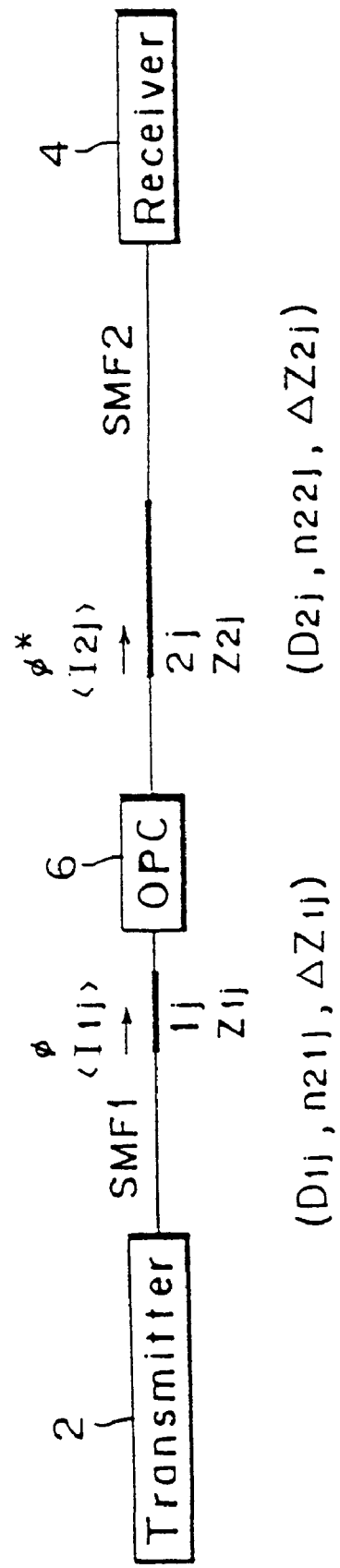
FIG. 5 shows the constitution of an optical fiber communication system representing a first embodiment of the present invention.

FIG. 5 shows a first embodiment of the present invention. Here, parameters of small sections 1j (length $\Delta z_{1j}$) and 2j (length $\Delta z_{2j}$) at positions $z_{1j}$ and $z_{2j}$ (defined by Eq.(17)) in transmission lines symmetrical with respect to a phase conjugator 6 are so set as represented by the following equations.

$$D_{1j}\Delta z_{1j} = D_{2j}\Delta z_{2j} \quad (22)$$

$$\frac{\omega_1 n_{21j}\langle I_{1j}\rangle}{D_{1j}} = \frac{\omega_2 n_{22j}\langle I_{2j}\rangle}{D_{2j}} \quad (23)$$

In the above, $\langle I_j \rangle$ denotes the average intensity in each section. Setting of such average intensity is the same as that already mentioned.

Hereinafter a concrete example will be explained. Suppose now that the dispersion of the optical fiber SMF1 is fixed as $D_1=-30$ ps/nm/km and the dispersion of the optical fiber SMF2 is fixed as $D_2=-0.3$ ps/nm/km. Then, from Ea. (20), $L_1/L_2=D_2/D_1=1/100$. Therefore, when the entire length $L_2$ of the optical fiber SMF2 is 50 km for example, it follows that $L_1=500$ m. This signifies that, if the waveform is previously distorted by the fiber of 500 m, distortionless transmission is rendered possible over a distance of 50 km. Or a plurality of fibers having mutually different fiber parameters may be disposed in series in such a manner as to satisfy the conditions of Eqs. (22) and (23), and the fibers may be spliced to each other.

Figure 6:
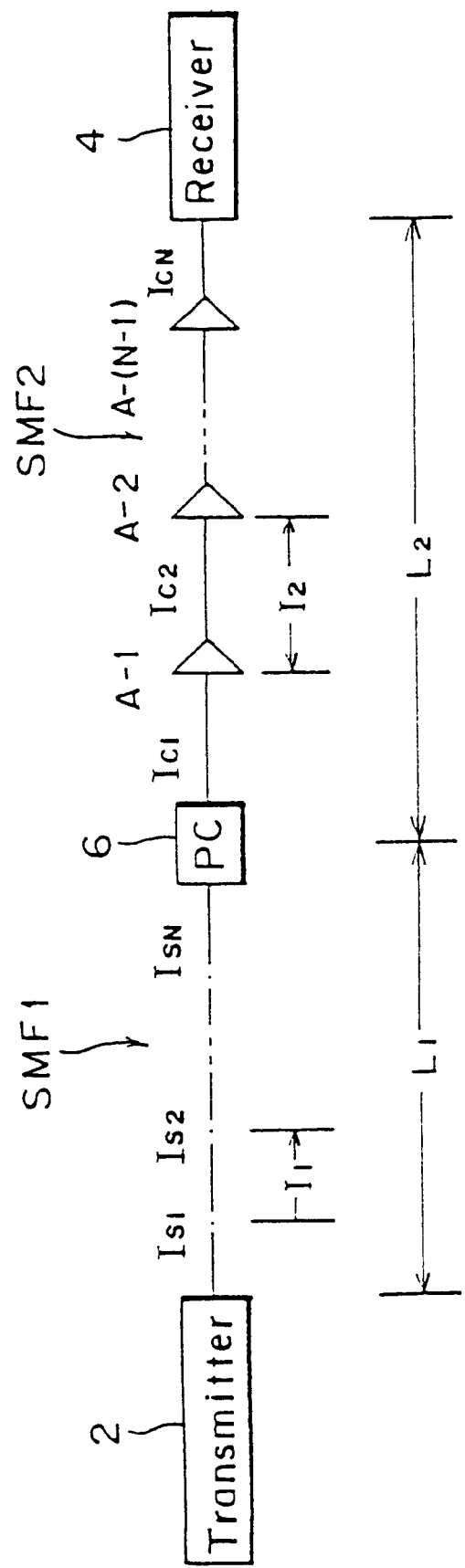
FIG. 6 shows the constitution of an optical fiber communication system representing a second embodiment of the invention.

FIG. 6 shows a second embodiment of the present invention. This embodiment represents an exemplary case where the invention is applied to multistage-repeating transmission employing optical amplifiers. Suppose now that (N-1) light amplifiers A-1, . . . , A-(N-1) are disposed in a transmission line of an optical fiber SMF2 at an interval of $l_2$ to perform light-amplified repeating transmission in a total length of $L_2=Nl_2$. In this example, as shown in FIG. 6, another optical fiber SMF1 is virtually divided into N sections, wherein each section has a length of $l_1$ and the total length is $L_1$. Since the ratio of $L_1$ to $L_2$ (ratio of $l_1$ to $l_2$) in this case is in reciprocal proportional to the dispersion of each fiber, the length $L_1$ is set as $L_1=(D_2/D_1) L_2$ $(l_1=(D_2/D_1)l_2)$. As for the optical Kerr effect, it is so set as to satisfy the condition of Ea. (23) in the corresponding small sections which are in the sections mutually corresponding with respect to a phase conjugator 6. For example, in the case of the dispersion values mentioned, the above setting is executed, in transmission over a repeating section of 50 km, with the optical fiber SMF1 actually or virtually divided at an interval of 500 m. Therefore, if the optical fiber SMF1 employed has a total length of 20 km and is divided by 40 at an interval of 500 m, then it becomes possible to perform transmission over a total length of 2000 km with 39 repeaters each covering 50 km posterior to the phase conjugator 6.

Although the division in this example is at equal intervals, the intervals need not be equalized in particular since the requisite is that the conditions of Eqs. (22) and (23) are satisfied with regard to the corresponding sections. Particularly relative to the optical fiber SMF1, no light amplifier is provided to compensate for the loss, so that some difficulties may be existent for the practical dispersion or power to satisfy the conditions. In such a case, the requisite regarding the dispersion or power can be alleviated by increasing the distance $l_1$, instead of equal-interval division thereof, in accordance with a reduction of the intensity caused by the loss. Also relative to the optical fiber SMF2, the loss effect can be diminished substantially by dividing each repeating section without fixing the dispersion in such a manner as to relatively increase the dispersion in a high-power portion while relatively decreasing the dispersion in a low-power portion. This method renders it possible to alleviate the requirements for the dispersion or power in the optical fiber SMF1.

It is a matter of course that the effect attainable by the above method is enhanced as the division becomes finer, but practically, the effect is sufficient if each line is divided into several portions. The number of required divisions is determined by the transmission speed and the transmission distance. In the embodiment of FIG. 6, the optical fiber SMF2 is used for light-amplified repeating transmission. However, it may be so modified that the optical fiber SMF1 is used for light-amplified repeating transmission and thereafter compensation is made in the optical fiber SMF2 by the same method. Such an example is shown in FIG. 7.

Figure 7:
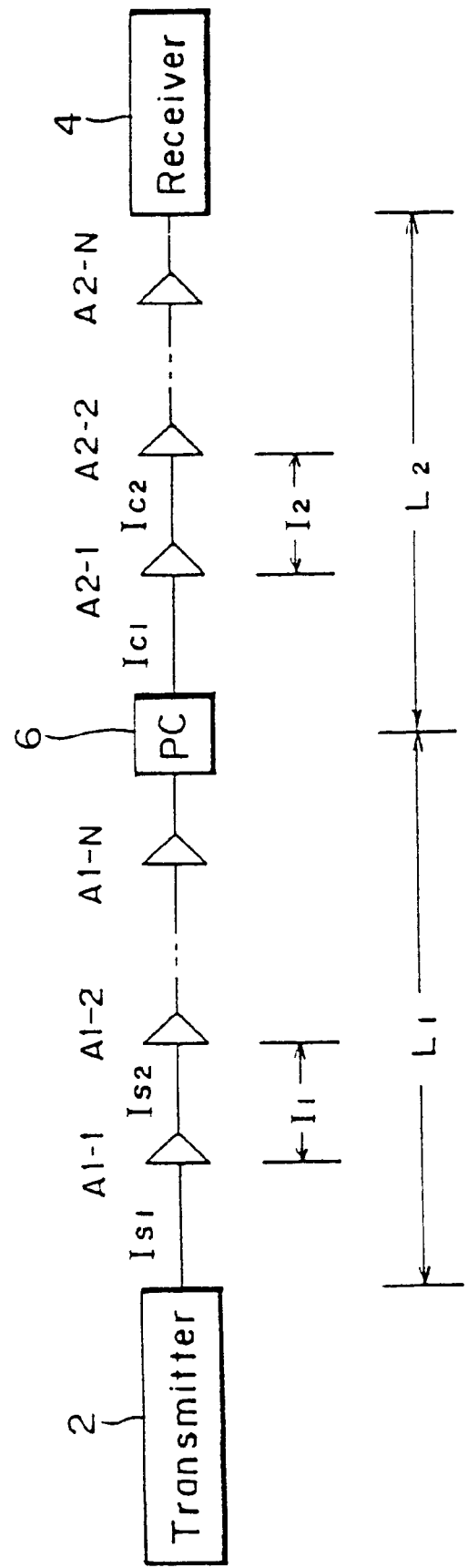
FIG. 7 shows the constitution of an optical fiber communication system representing a third embodiment of the invention.

FIG. 7 shows a third embodiment of the present invention. In this example, the numbers of repeaters anterior and posterior to a phase conjugator 6 are mutually equalized, and the conditions are so set that Eqs. (22) and (23) are satisfied in the sections symmetrical with respect to the phase conjugator 6. In this case also, as mentioned above, the loss effect can be diminished substantially by dividing each repeating section without fixing the dispersion in the optical fiber SMF2 in such a manner as to relatively increase the dispersion in a high-power portion while relatively decreasing the dispersion in a low-power portion.

Figure 8:
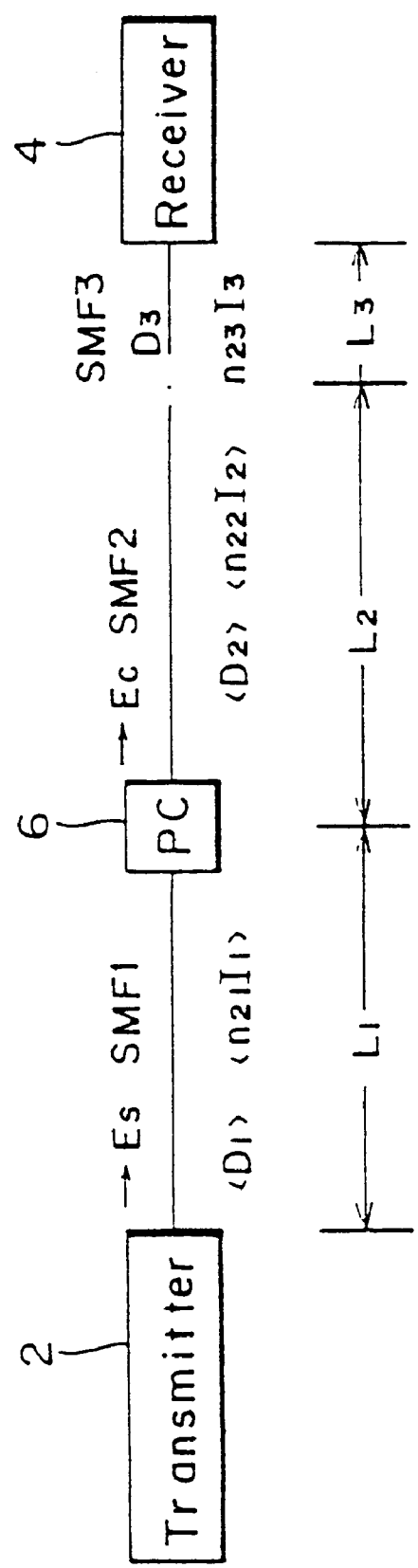
FIG. 8 shows the constitution of an optical fiber communication system representing a fourth embodiment of the invention.

FIG. 8 shows a fourth embodiment of the present invention. Here is illustrated an application to an exemplary case where, in transmission employing average intensity approximation, both the dispersion and the optical Kerr effect are not fixed in the transmission line. First, regarding the average value of the dispersion, the conditions are so set that $$(D_1) L_1 = (D_2) L_2 \quad (24)$$

can be satisfied, and further regarding the average value of the product of the nonlinear refractive index and the light intensity, the conditions are so set that $$(n_{21}|I_1) L_1 = (n_{22}|I_2) L_2 \quad (25)$$

can be satisfied, whereby rough compensation is rendered possible. As for the residual of the compensation, the dispersion $D_3$ of a third optical fiber SMF3 having a length $L_3$ and disposed between an optical fiber SMF2 and a receiver 4 as shown in FIG. 8, and the optical Kerr effect $n_{22}I_3$ in such fiber SMF3, are adequately adjusted to thereby realize substantially complete compensation.

Figure 9:
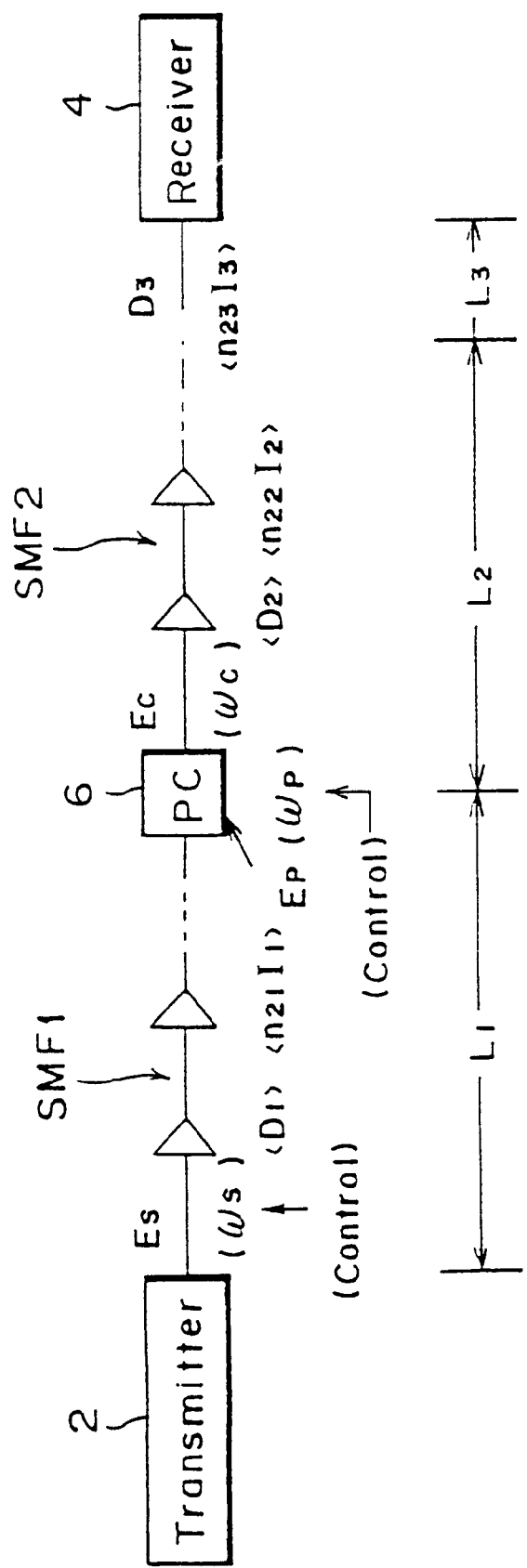
FIG. 9 shows the constitution of an optical fiber communication system representing a fifth embodiment of the invention.

FIG. 9 shows a fifth embodiment of the present invention. This represents an application of the fourth embodiment of FIG. 8 to a light-amplified multi-repeating transmission system. In this case, a plurality of repeaters are provided at positions anterior and posterior to a phase conjugator 6, and the conditions may be so set as to satisfy Eqs. (22) and (23) in the sections mutually corresponding with respect to the phase conjugator 6. More roughly, satisfactory compensation is achievable to a certain extent by setting the conditions in such a manner that the above equations are satisfied with regard to the average value in the entire length, as disclosed in Japanese Patent Application No. Hei 5 (1993)-221856. For attaining further enhanced compensation, a third optical fiber SMF3 may be disposed as in the foregoing fourth embodiment of FIG. 8, and its dispersion $D_3$ and optical Kerr effect $n_{23}I_3$ may be adequately adjusted.

In a practical long-distance transmission system, there occur some fluctuations in the dispersion values due to ambient environment. Particularly the dispersion fluctuations derived from temperature variations are considerably great, and such harmful influence is noticeable especially in a system where setting is at the dispersion value proximate to zero dispersion. The dispersion value proximate to zero dispersion can be changed in accordance with a second-order dispersion inclination (approx. 0.08 ps/nm²/km) by changing the wavelength of the signal light. Meanwhile in a system for generating phase conjugate light by means of four-wave mixing, an angular frequency $\omega_C$ of the phase conjugate light, an angular frequency $\omega_P$ of pump light and an angular frequency $\omega_S$ of signal light are in a relationship of $\omega_C = \omega_P - \omega_S$, so that $\omega_C$ is changeable by chancing $\omega_S$ or $\omega_P$. Thus, it becomes possible to always perform optimal transmission in compliance with any variations of the dispersion by adjusting $\omega_S$ in the transmitter or by adjusting $\omega_P$ in the phase conjugator 6 in response to a control signal obtained from an unshown terminal station.

Figure 10:
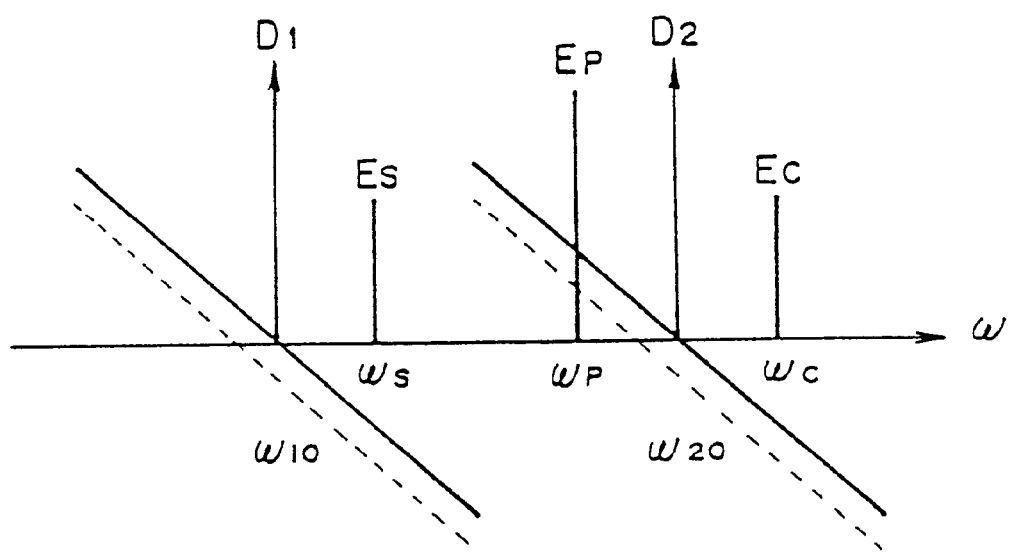
FIG. 10 shows an optical frequency arrangement to zero dispersion wavelengths in two fibers.

FIG. 10 shows a frequency arrangement of signal light, pump light and phase conjugate light to the respective zero dispersion wavelengths $\omega_{10}$ and $\omega_{20}$ of optical fibers SMF1 and SMF2. If the dispersion curves of the two fibers are shifted in the same direction by some change of the environment (as indicated by chained lines in FIG. 10), $\omega_S$ and $\omega_C$ should be shifted in the same direction. However, since $\omega_C$ at is shifted in the reverse direction to any change of $\omega_S$, it is desired that, simultaneously with a change of $\omega_S$, $\omega_P$ is also changed in the same direction and by the same value as $\omega_S$. In the case of FIG. 10 which is the simplest of all, $\omega_S$ and $\omega_P$ may be shifted in the same direction and by the same value ($\Delta\omega$) (i.e., $\omega_C + \Delta\omega = 2(\omega_P + \Delta\omega) - (\omega_S + \Delta\omega)$). Since the dispersion variations are not so simple actually, proper correction needs to be executed in conformity with each situation. Practically, an optimal state is attained by fine adjustments of $\omega_S$ and $\omega_P$ while monitoring, e.g., the received waveform in the terminal station.

Figure 11:
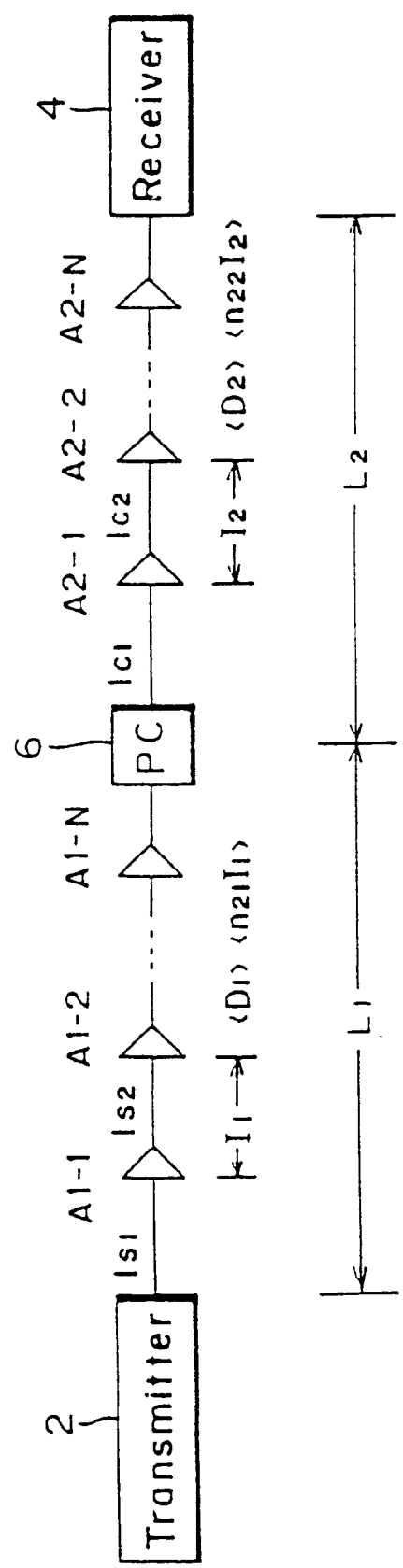
FIG. 11 shows the constitution of an optical fiber communication system representing a sixth embodiment of the invention.

FIG. 11 shows a sixth embodiment of the present invention. In this embodiment where the average intensity is adopted fundamentally, the dispersion control shown in FIG. 7 is executed to alleviate the harmful influence of the power change (deterioration) between light amplifiers. More specifically, each repeating section is divided into several portions, and the dispersion value is gradually decreased in the forward direction of transmission.

Figure 12:
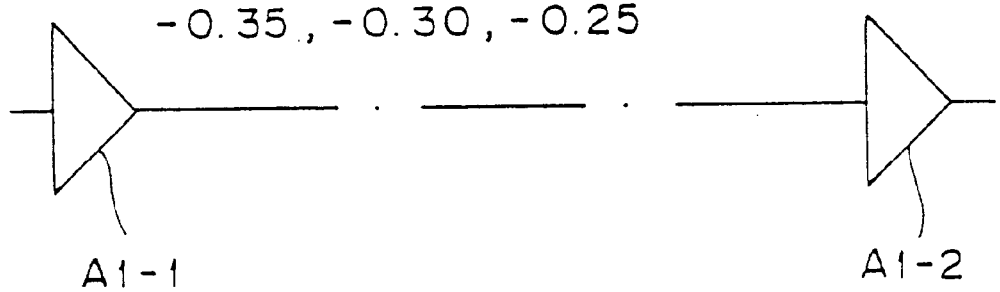
FIG. 12 shows an example of dispersion control in an average intensity method.

An example thereof is shown in FIG. 12. Relative to a case where the average dispersion value is set to −0.30 ps/nm/km, FIG. 12 represents an example where each repeating section is divided into three portions, and the dispersion values therein are so set as to become −0.35, −0.30 and −0.25 ps/nm/km respectively in the forward direction of transmission. When the relay section has a length of 51 km in the above example, then it is divided at an interval of 17 km per portion, so that the dispersion inclination becomes approximately −0.04 dB/km. Therefore, if the fiber loss is −0.20 dB/km, it is possible to reduce the change of the ratio, which is expressed by Eq. (23), to −0.16 dB/km or so. Consequently, there is realizable a state equivalent to the one with less loss, whereby it is rendered possible to extend the reheating section of the light amplifier. And the effect of compensation for the distortion can be enhanced even if the repeating interval remains the same.

Figure 13:
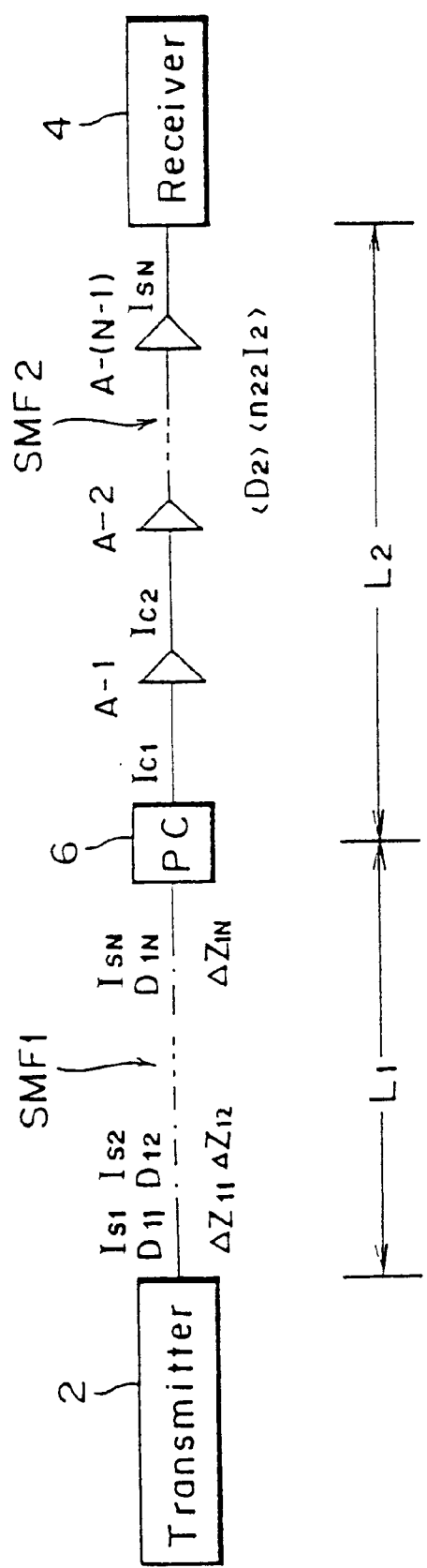
FIG. 13 shows the constitution of an optical fiber communication system representing a seventh embodiment of the invention.

FIG. 13 shows a seventh embodiment of the present invention. This embodiment represents an example where, when the invention is applied to a light-amplified multi-repeating transmission system, the ratio of the nonlinear effect and dispersion is maintained constant in an optical fiber SMF1. In this example, the optical fiber SMF1 is virtually divided into a plurality of sections, and the sum of the dispersion value $D_{sj}\Delta z_{sj}$ in each section j is equalized to the total GVD of the optical fiber SMF2, and further the absolute value ($n_{21}I_{Sj}/D_{Sj}$) of the nonlinear effect in each section j is set to be fixed. Meanwhile in the optical fiber SMF2 is performed light-amplified multi-repeating transmission which employs average value approximation, wherein the total of the nonlinear effect in the optical fiber SMF1 is equalized to the total of the average value of the nonlinear effect in the optical fiber SMF2. Also with regard to the optical fiber SMF2, the same setting may be executed as for the optical fiber SMF1.

Since the reduction of $I_{sj}$ resulting from the loss can be compensated by gradually decreasing $D_{1j}$, it is possible to keep the ratio of the nonlinear effect and dispertion constant. Moreover, the dispersion value in each section can be kept constant by increasing the length $\Delta_{1j}$ of each section in inverse proportion to the loss. That is, the compensation is so made as to keep constant both of $n_{21}I_{1j}\Delta z_{1j}$ and $D_{1j}\Delta z_{1j}$. In this embodiment, the number of divisions of the optical fiber SMF1 is equal to the number of repeaters in the optical fiber SMF2. However, in such average value approximation, similar effect is practically obtainable if the number of divisions of the optical fiber SMF1 is set to be less than the number of repeaters in the optical fiber SMF2. Namely, the average value per some divisions in the same number of divisions is used for substitution. The effect attained in this case is dependent on the transmission speed and the transmission distance.

Figure 14:
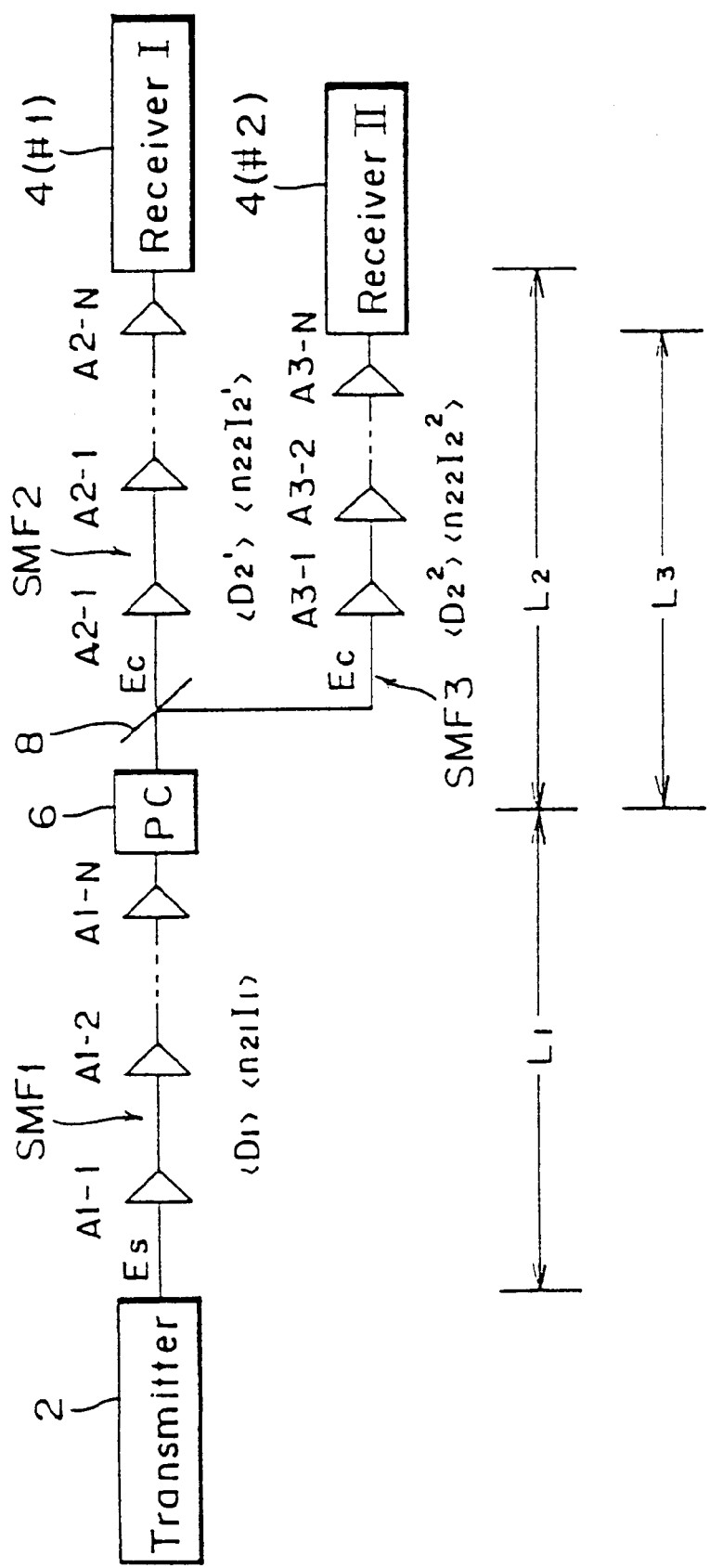
FIG. 14 shows the constitution of an optical fiber communication system representing an eighth embodiment of the invention.

FIG. 14 shows an eighth embodiment of the present invention. In this embodiment, the light outputted from a phase conjugator 6 is branched into two by means of an optical coupler 8 or an unshown optical switch, and one branch light is transmitted via an optical fiber SMF2 (length $L_2$) to a receiver 4 (#1) while the other branch light is transmitted via an optical fiber SMF3 (length $L_3$) to another receiver 4 (#2). The optical fiber SMF2 is equipped with light amplifiers A2-1, 2, ..., N; and the optical fiber SMF3 is equipped with light amplifiers A3-1, 2, ..., N. Also in an exemplary case where the present invention is applied to branching a transmission line as in this embodiment, it is possible to realize desired transmission by branching the output light from a nonlinear optical medium 6 and utilizing the dispersions and the light intensities which conform to the distances to the receivers 4 (#1, #2).

Figure 15:
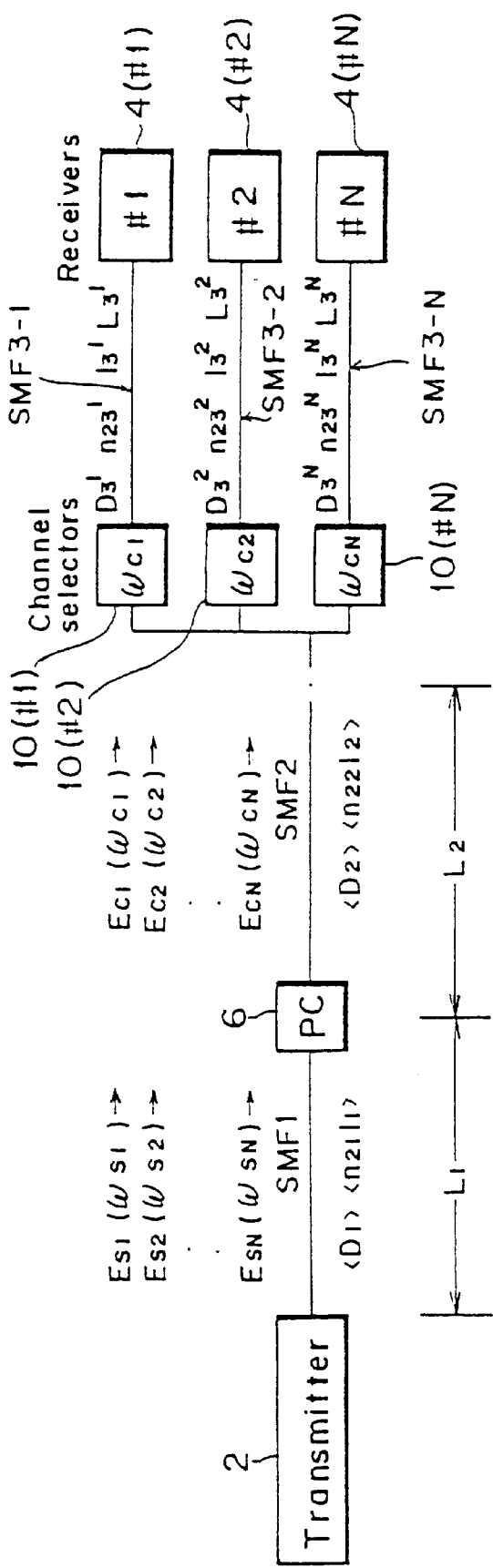
FIG. 15 shows the constitution of an optical fiber communication system representing a ninth embodiment of the invention.

FIG. 15 shows a ninth embodiment of the present invention. In this embodiment, a plurality of third fibers are used to perform additional compensation in WDM transmission. Denoted by 10 (#1, #2, ..., #N) in this diagram are optical filters for selection of channels with regard to the phase conjugate light transmitted via an optical fiber SMF2. The light outputs obtained from the optical filters 10 (#1, #2, ..., #N) are transmitted via compensating optical fibers SMF3-1, 2, ..., N respectively to receivers 4 (#1, #2, ..., N). WDM signal lights $E_{S1}, E_{S2}, ..., E_{SN}$ (frequencies: $\omega_{S1}, \omega_{S2}, ..., \omega_{SN}$) of N channels transmitted via the optical fiber SMF1 are transformed by a phase conjugator 6 into WDM phase conjugate lights $E_{C1}, E_{C2}, ..., E_{CN}$ (frequencies: $\omega_{C1}, \omega_{C2}, ..., \omega_{CN}$) of N channels, which are further transmitted via the optical fiber SMF2 and then are received by the corresponding receivers.

Figure 16:
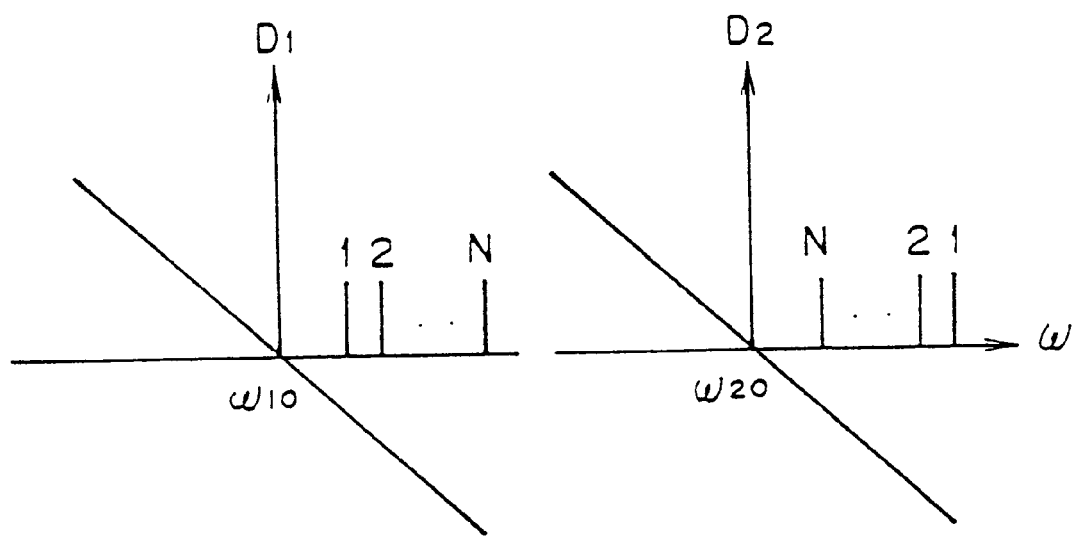
FIG. 16 shows a frequency arrangement in the ninth embodiment of the invention.

In this embodiment, the channels in the optical fibers SMF1 and SMF2 are so dispersed as illustrated in FIG. 16. In the dispersion compensation using a phase conjugator, signs of dispersion anterior and posterior to the phase conjugator need to be identical, so that the frequency arrangement with respect to zero dispersion becomes such as shown in FIG. 16. In the shown example, there is executed a transformation from normal dispersion to normal dispersion. In this case, the absolute value of the dispersion to the first channel is minimum in the optical fiber SMF1, whereas in the optical fiber SMF2, the absolute value of the dispersion to the Nth channel is minimum. In principle, therefore, it is difficult to achieve complete dispersion compensation simultaneously for the entire channels. In the ninth embodiment of FIG. 15, frequency selection is executed with regard to each channel after the output of the optical fiber SMF2 is branched, and then additional compensation is executed by the use of third fibers SMF3-1, 2, ..., N which conform to the residual compensation amounts for the individual channels.

Figure 17:
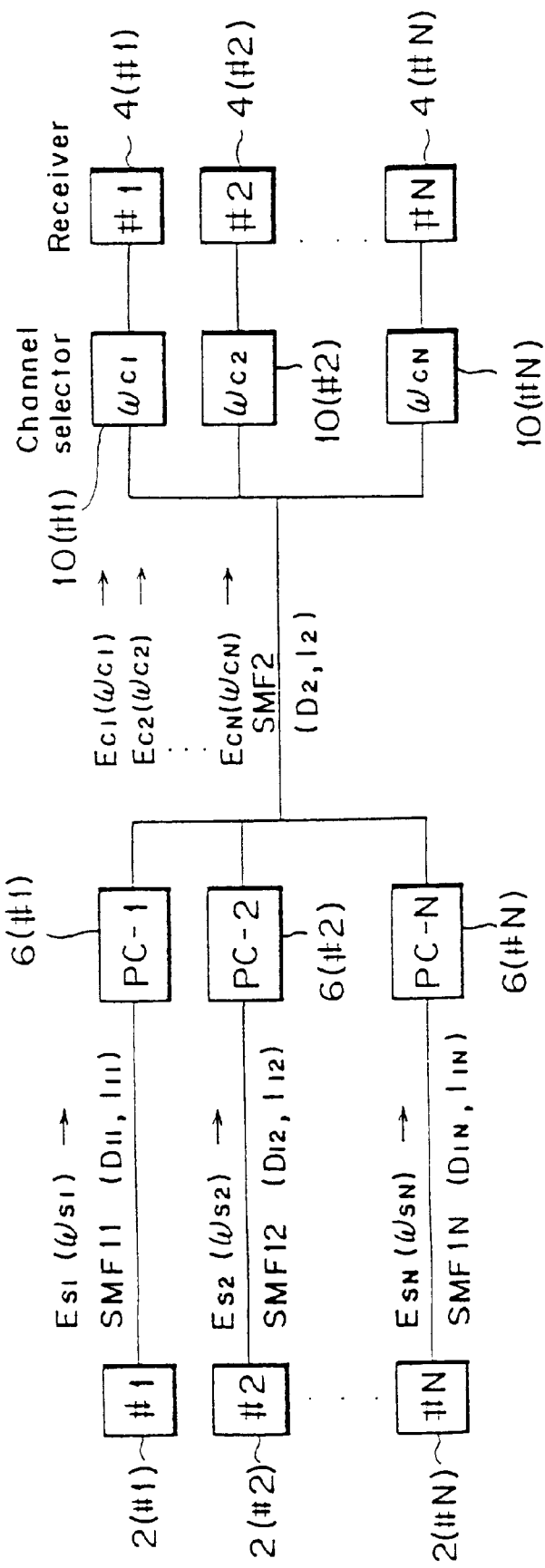
FIG. 17 shows the constitution of an optical fiber communication system representing a tenth embodiment of the invention.

A tenth embodiment of the present invention shown in FIG. 17 is contrived to execute ideal compensation equally for the entire channels. In this embodiment, signal lights of respective channels are transmitted via individual fibers SMF11, 12, ..., 1N with the intensities ($I_{11}, I_{12}, ..., I_{1N}$) conforming to different dispersions. The output light of the optical fiber SMF1 is converted into phase conjugate light by phase conjugators 6 (#1), (#2), ..., (#N) of individual channels or by an unshown single phase conjugator for the entire channels, and the light outputs thereof are transmitted via a common optical fiber SMF2 to be received in the same manner as in the foregoing ninth embodiment of FIG. 15. In this diagram, an optical multiplexer for combining a plurality of signal lights or phase conjugate lights is omitted. A third optical fiber SMF3 is not necessary here. The dispersion and the nonlinear effect in each channel may be set by any of the methods mentioned hereinabove.

Since the phase conjugator has polarization dependency, its conversion efficiency is different in accordance with the polarized state of signal light, whereby the overall system characteristic is rendered unstable. Furthermore, optical component elements used in the phase conjugator or the light amplifier also have polarization dependency in most cases, so that the signal level is rendered unstable when multiple stages thereof are connected. Such instability can be suppressed by applying polarization diversity or polarization active control, or by executing polarization scrambling for the signal light or pump light. Particularly the method of executing polarization scrambling for the signal light in a transmitter is advantageous due to a simple constitution and in view of elimination of the harmful influence from various kinds of polarization dependency which raise some problems currently in long distance transmission.

Figure 18:
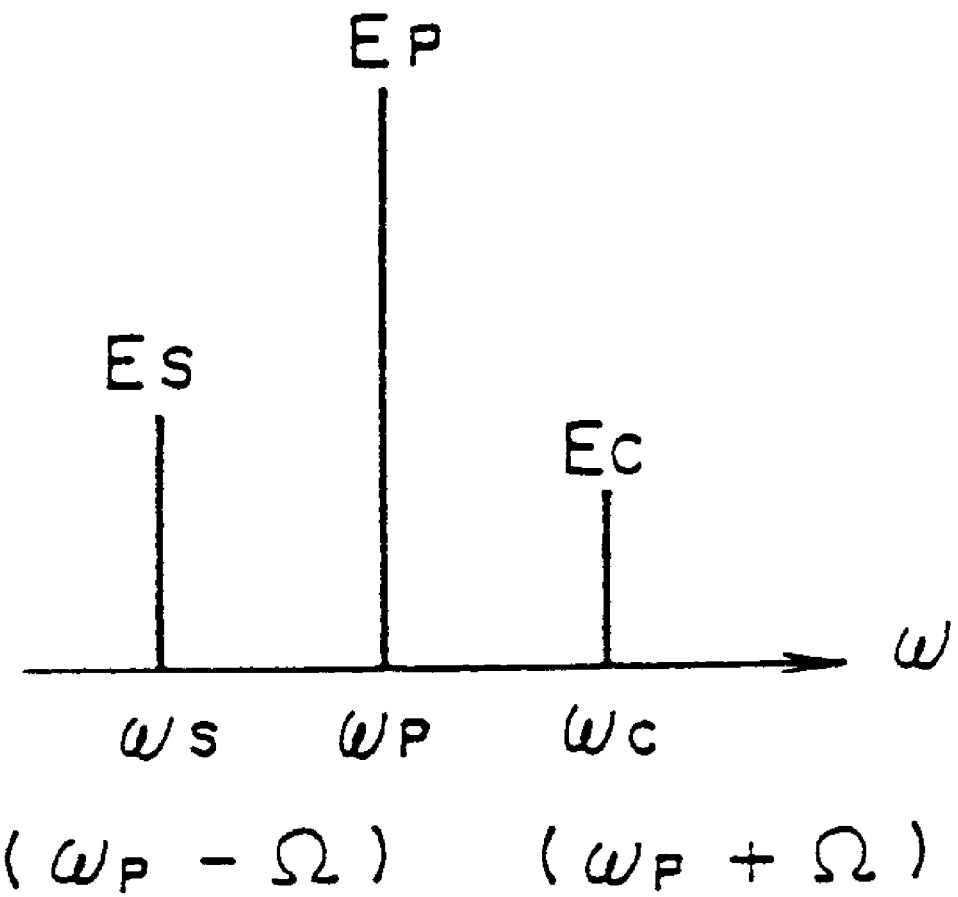
FIG. 18 shows a frequency arrangement in optical phase conjugation using four-wave mixing.

FIG. 18 shows a frequency arrangement in optical phase conjugation where four-wave mixing is employed. Hereinafter an explanation will be given, with reference to this diagram, on a frequency arrangement in the case of applying the present invention to light-amplified multi-repeating transmission. Generally a gain band is existent in a light amplifier, and therefore it has a frequency $\omega_g$ which gives a peak of the gain. When the number of repeating light amplifiers is small, there is no necessity of taking this gain peak into account. However, if the number of such repeaters reaches the order of several tens or hundreds, there occurs narrow-band filtering effect with respect to a specific wavelength. In the case of a known EDFA (erbium doped fiber amplifier) for example, this wavelength is in the vicinity of 1558.5 nm. In a system employing a phase conjugator, the wavelengths of signal light and phase conjugate light are positionally symmetrical with respect to the wavelength of pump light as shown in FIG. 18, and therefore the gain peak can be ensured over the whole transmission line by shifting the peak wavelength in regard to half the entire light amplifiers. When it is practically difficult to perform such shift, the frequencies are set as $\omega_c = \omega_g$ in the transmission via the optical fiber SMF2 using the current peak wavelength, and $\omega_S$ is set to a frequency spaced apart by $2\Omega$ from $\omega_g$ in the transmission via the optical fiber in the optical fiber SMF1, an optical filter may be used to eliminate-spontaneous emission light from the light amplifier so as to prevent the filtering effect of the light amplifier. Meanwhile in the optical fiber SMF2, none of optical filter is necessary since the pump light and the signal light passing through the phase conjugator can be eliminated by the filtering effect of the light amplifier, whereby the construction is effectively simplified. It is a matter of course that, instead of utilizing the filtering effect of such EDFA, each repeating amplifier may be equipped with an optical filter to eliminate spontaneous emission light.

In this case, a satisfactory result can be achieved by providing a plurality of band pass filters correspondingly to a plurality of light amplifiers so as to eliminate the spontaneous emission light noise generated in the light amplifiers. It is desired that the pass bands of such band pass filters are so set as to become narrower in accordance with an increase of the distance from the phase conjugator. The reason is based on the following fact. The spectrum of the signal component in the output light from the transmitter is the narrowest as it is free from any distortion. When the signal component is inputted via the first optical fiber to the phase conjugator, its spectrum is most widened as it is affected by the distortion. And in accordance with the principle of the present invention, the widened spectrum of the signal component is gradually narrowed in the longitudinal direction of the second optical fiber. Therefore, effective elimination of the noise component is rendered possible by setting the pass band of each band pass filter in the manner mentioned above.

Figure 19:
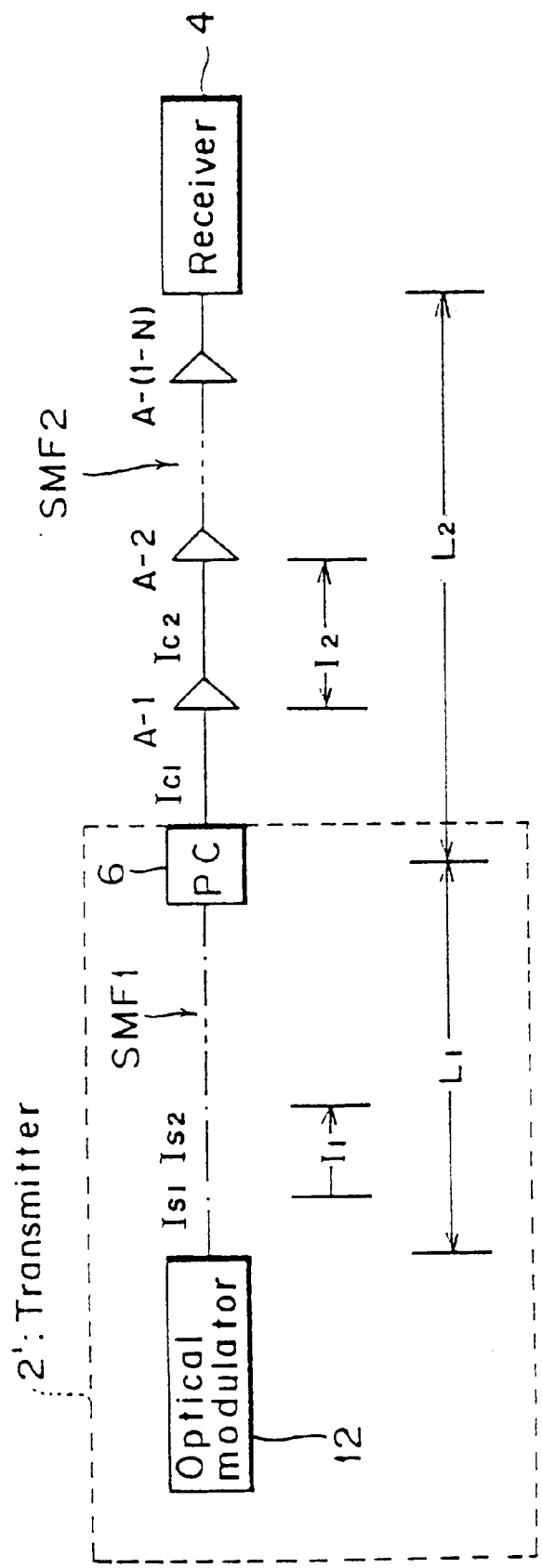
FIG. 19 shows the constitution of an optical fiber communication system representing an eleventh embodiment of the invention.

FIG. 19 shows an eleventh embodiment of the present invention. This embodiment represents an example of utilizing the filtering effect of a light amplifier most efficiently. In comparison with the second embodiment of FIG. 6, the eleventh embodiment is characterized in the point that a transmitter 2' includes both an optical fiber SMF1 and a phase conjugator 6. The optical fiber SMF1 is supplied with signal light outputted from an optical modulator 12.

According to this constitution, merely the phase conjugate light passes through light amplifiers A-1, 2, . . . , (1-N) used for repeating along an optical fiber SMF2 as a transmission line, so that the filtering effect of each light amplifier can be utilized efficiently by setting the frequencies as $\omega_c = \omega_g$. Consequently it becomes possible for a receiver 4 to receive distortionless pulses, and the harmful influence derived from variations of polarization can be minimized since the phase conjugator 6 is not existent in the transmission line. More specifically, a constant state of polarization can be ensured in a transmitter 2' with facility, so that it is possible to alleviate the harmful influence exerted on the phase conjugator 6 by the variations of polarization in the transmission line. Preferably the dispersion D1 of the optical fiber SMF1 is set to be relatively large, whereby the length $L_2$ of the optical fiber SMF2 can be set to a sufficiently great value, hence realizing long-distance transmission.

Figure 20:
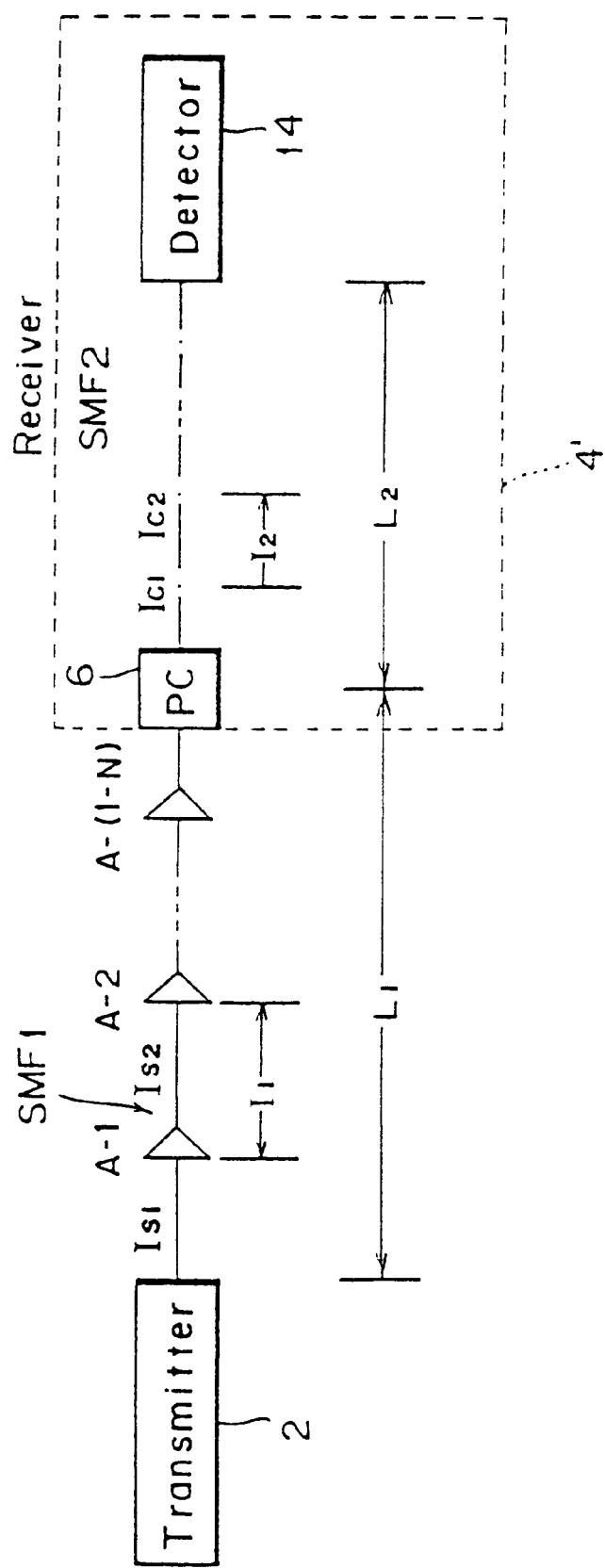
FIG. 20 shows the constitution of an optical fiber communication system representing a twelfth embodiment of the invention.

FIG. 20 shows a twelfth embodiment of the present invention. In this embodiment, a receiver 4' includes both a phase conjugator 6 and an optical fiber SMF2. In an optical fiber SMF1 serving as a transmission line, there are provided a plurality of loss-compensating light amplifiers A-1, 2, . . . , (1-N). After arrival at the receiver 4', the repeated signal light is transformed into phase conjugate light by the phase conjugator 6 and then is supplied to a detector 14 via the optical fiber SMF2.

In this embodiment, adequate countermeasure is required in the receiver 4' against variations of the polarized state in the optical fiber SMF1 which serves as a transmission line. Considering that wavelength selection is possible by means of pump light in the phase conjugator 6, this embodiment is advantageous for use in an optical WDM transmission system or the like. More specifically, compensation for the waveform distortion can be executed by first changing, in WDM transmission, the frequency of the pump light in the phase conjugator to thereby change the frequency of the phase conjugate light, then performing channel selection by means of an optical filter or the like in the posterior stage, and thereafter transmitting the phase conjugate light via the optical fiber SMF2. If the light is branched into the number of channels anterior or posterior to the phase conjugator 6, the entire channels can be received simultaneously.

Figure 21:
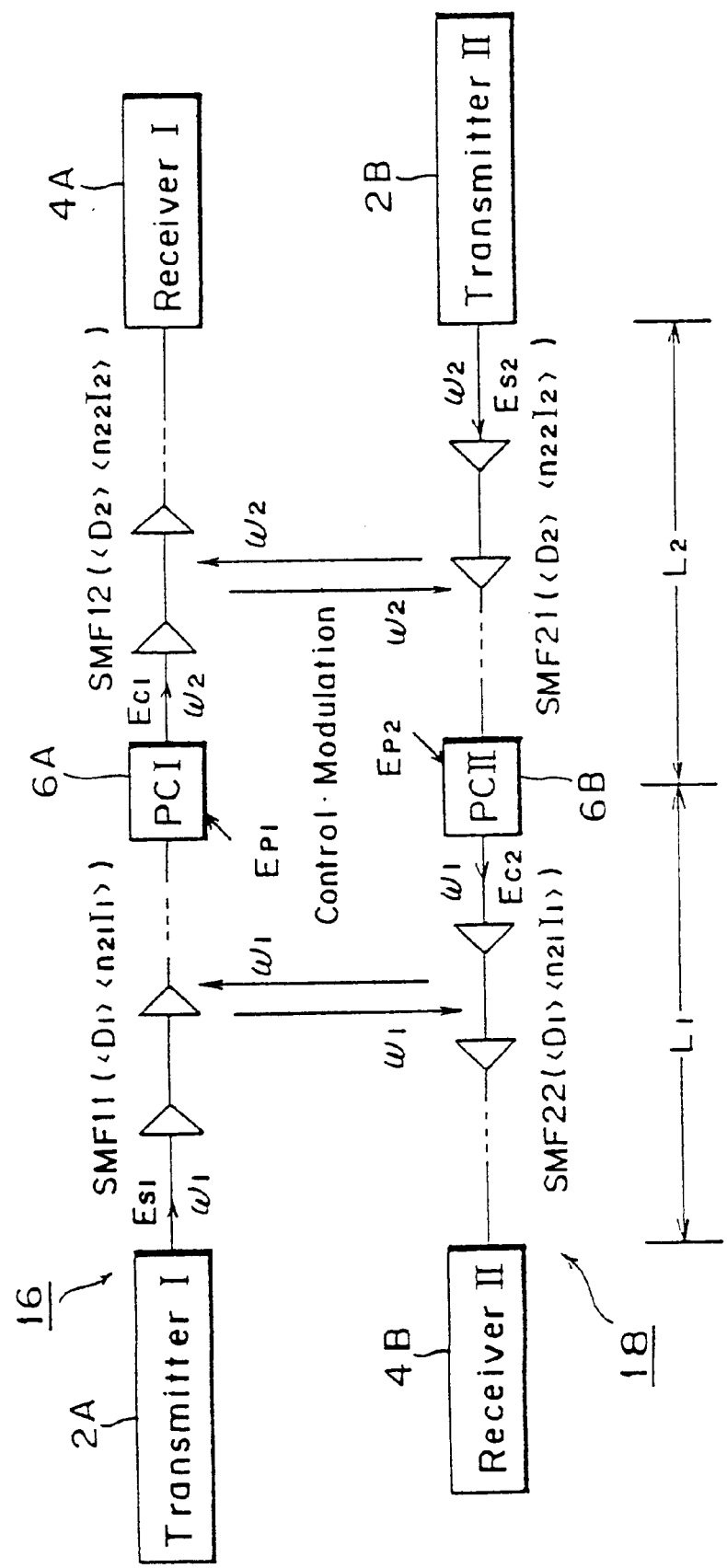
FIG. 21 shows the constitution of an optical fiber communication system representing a thirteenth embodiment of the invention.

FIG. 21 shows a thirteenth embodiment of the present invention. This embodiment represents an example of applying the invention to bidirectional transmission, where there are employed two of the average-approximation transmission systems shown in FIG. 9. A down circuit 16 comprises a transmitter 2A, a receiver 4A, a phase conjugator 6A, an optical fiber SMF11 laid between the transmitter 2A and the phase conjugator 6A, and an optical fiber SMF12 laid between the phase conjugator 6A and the receiver 4A. An up circuit 18 comprises a transmitter 2B, a receiver 4B, a phase conjugator 6B, an optical fiber SMF21 laid between the transmitter 2B and the phase conjugator 6B, and an optical fiber SMF22 laid between the phase conjugator 6B and the receiver 4B. A plurality of loss-compensating light amplifiers are provided in each of the optical fibers.

In the down circuit 16, signal light $E_{S1}$ (frequency $\omega_1$) outputted from the transmitter 2A is transmitted after being transformed into phase conjugate light $E_{C1}$ (frequency $\omega_2$) by the phase conjugator 6A. Meanwhile in the up circuit 18, signal light $E_{S2}$ (frequency $\omega_2$) outputted from the transmitter 2B is transmitted after being transformed into phase conjugate light $E_{C2}$ (frequency $\omega_1$) by the phase conjugator 6B. In this case, the entire lights of the frequency $\omega_1$ are transmitted on the left sides of the phase conjugators 6A and 6B in the diagram, while the entire lights of the frequency $\omega_2$ are transmitted on the right sides thereof. Consequently, even when the pass frequency bands are limited with insertion of optical filters in the individual circuits, the signals can be transferred properly if the frequencies are the same. Namely, it is possible to directly apply the technique of turning around a monitor signal or the like executed in ordinary bidirectional transmission.

Figure 22:
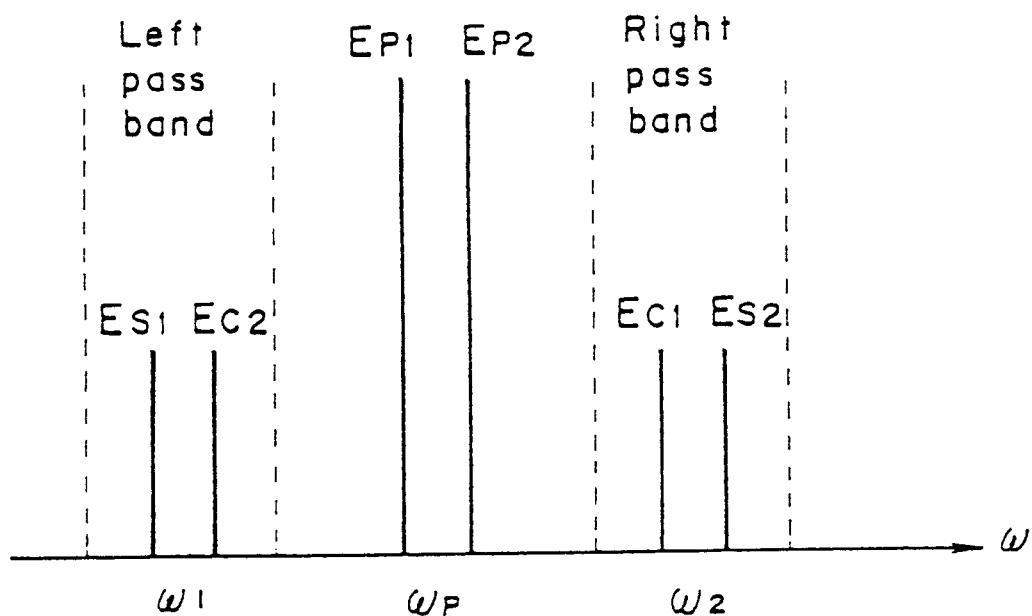
FIG. 22 shows a frequency arrangement in bidirectional transmission.

The frequency of the down circuit and that of the up circuit are set to be mutually coincident in this embodiment. However, such frequency coincidence is not exactly needed in the down and up circuits if the frequencies are included in the above-described pass bands. This aspect is shown in FIG. 22 which represents a frequency arrangement in each circuit. Although the frequencies are set as $\omega_1 \neq \omega_2$ in this example, it is obvious that the relationship may also be set as $\omega_1 = \omega_2$. The condition of $\omega_1 = \omega_2$ can be satisfied by using a phase conjugator adapted for application of degenerate four-wave mixing, or by connecting an odd number of phase conjugators in series.

Differing from the embodiment of FIG. 21 where two phase conjugators are employed, a single bidirectional phase conjugator may be used in common as well. Furthermore, when the two circuits are completely independent of each other or when any filter for selecting a specific frequency (including any form of connection to induce filter effect) is not existent in a transmission line, the parameters or frequencies in the optical fibers may be set to arbitrary values. In such a case, each phase conjugator need not be disposed at the same position.

Figure 23:
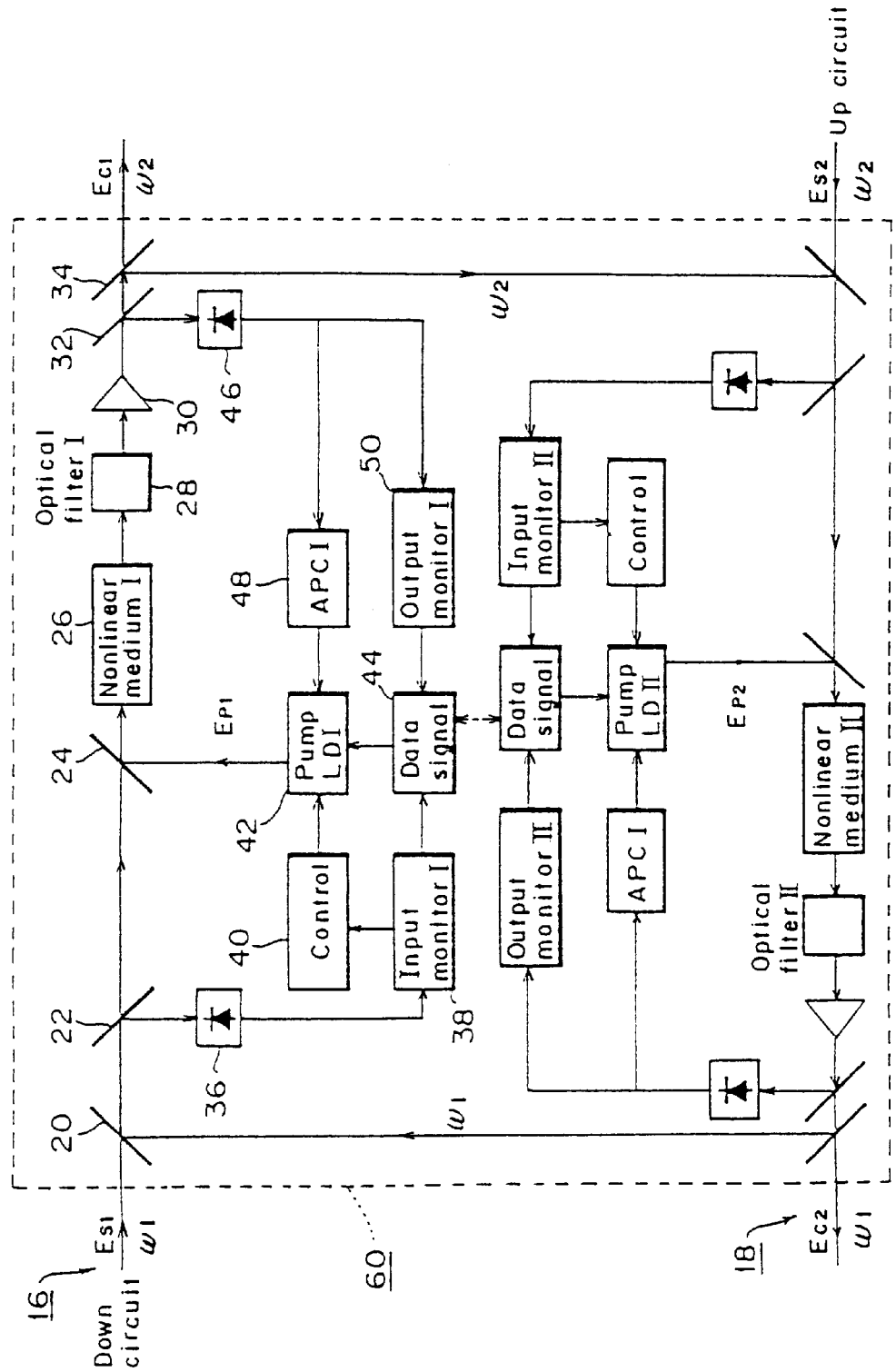
FIG. 23 is a block diagram of a phase conjugator for bidirectional transmission.

FIG. 23 is a block diagram of a phase conjugator for bidirectional transmission. This phase conjugator 60 is disposed, for example, at the middle of each of the down circuit 16 and the up circuit 18 in the system of FIG. 21. Since the partial configuration relative to the down circuit 16 and that relative to the up circuit 18 are the same, an explanation will be given below merely on the configuration relative to the down circuit 16 alone.

In the down circuit 16, signal light inputted to the phase conjugator 60 is supplied via optical couplers 20, 22 and 24 to a nonlinear medium 26. Phase conjugate light generated in the nonlinear medium 26 is outputted via an optical filter 28, a light amplifier 30 and optical couplers 32 and 34 in this order. The optical coupler 20 serves to partially couple the output light of the up circuit 18 to the input light of the down circuit 16. The optical coupler 22 partially branches the input light of the down circuit 16, and the branch light is supplied to a photo diode 36. The output of the photo diode 36 is supplied to an input monitor circuit 38, whose output is then supplied to both a control circuit 40 and a data signal circuit 44. Thereafter the output of the control circuit 40 and the output of the data signal circuit 44 are supplied to a pump light source 42, whose pump light is supplied via the optical coupler 24 to the nonlinear medium 26. A portion of the output light branched by the optical coupler 32 is supplied to a photo diode 46, whose output is then supplied to an APC circuit 48 and an output monitor circuit 50. The output of the APC circuit 48 and that of the output monitor circuit 50 are supplied respectively to the pump light source 42 and the data signal circuit 44. Meanwhile a portion of the output light branched by the optical coupler 34 is supplied to the input side of the up circuit 18.

The input signal light $E_{S1}$ and the pump light $E_{P1}$ are optically coupled and supplied to the nonlinear medium 26, whereby phase conjugate light $E_{C1}$ is generated. The phase conjugate light is partially branched and, after photo-electric conversion, the power and the frequency of the pump light source 42 are so controlled that the power of the phase conjugate light is adjusted to a required value. Low-degree intensity modulation or frequency modulation is executed to the pump light source 42 by the data signal having the monitor value of the output power, whereby the data signal is superimposed on the phase conjugate light. The input signal light is partially branched and, after photoelectric conversion, signal superimposition similar to the above is executed by the data signal having the monitor value of the converted signal, or various control actions are executed by the monitor signal delivered from the transmitting station. Such data signals are electrically transferred to or from the up circuit whenever required. Out of the operations mentioned, the output power control may be performed in a form including output control of the light amplifier 30.

In any of the embodiments described hereinabove, a single phase conjugator is disposed between a transmitter and a receiver. However, longer-distance transmission is rendered possible in a modification where a plurality of the fundamental constitutions of the present invention except its transmitter and receiver are connected in series, and the transmitter and the receiver are disposed at both ends of such series connection.

Although the seventh embodiment of FIG. 13 is not included in the fundamental constitution of the present invention shown in FIGS. 1 to 3, a variety of applications relative to the fundamental constitution mentioned in detail above are adapted for the seventh embodiment of FIG. 13 as well. For example, a bidirectional transmission system can be constructed by utilizing the seventh embodiment of FIG. 13.

According to the present invention, as described hereinabove, there is achieved an advantage of providing an improved optical fiber communication system which is capable of compensating for any waveform distortion derived from the GVD and optical Kerr effect.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical fiber communication system comprising: a first optical fiber for transmitting signal light therethrough; a phase conjugator for generating, in response to said signal light supplied from said first optical fiber, phase conjugate light corresponding to said signal light; and a second optical fiber for transmitting said phase conjugate light supplied thereto from said phase conjugator; wherein, when said first and second optical fibers are virtually divided into the same number of sections respectively, the average values of the chromatic dispersions of the relevant sections which, out of the entire divided sections, correspond to each other as counted consecutively from said phase conjugator, are so set as to have the same sign and the value approximately in inverse proportion to the length of each divided section, and the average value of the product of the optical frequency, the signal light intensity and the nonlinear refractive index in each divided section is so set as to be approximately in inverse proportion to the length of each divided section.

2. The optical fiber communication system according to claim 1 wherein said signal light is frequency division multiplexed signal light obtained by multiplexing a plurality of light outputs of mutually different frequencies.

3. The optical fiber communication system according to claim 1, wherein each of said first and second optical fibers is a silica fiber.

4. The optical fiber communication system according to claim 1, wherein said phase conjugator comprises a nonlinear optical medium, a pump light source for generating pump light, and an optical means for supplying the pump light and the signal light to said nonlinear optical medium.

5. The optical fiber communication system according to claim 4, wherein said nonlinear optical medium presents third-order nonlinear optical effect, and said phase conjugate light is generated therefrom by four-wave mixing.

6. The optical fiber communication system according to claim 5, wherein said third-order nonlinear optical medium is an optical fiber, and the wavelength of said pump light is approximately equal to the zero dispersion wavelength of said optical fiber.

7. The optical fiber communication system according to claim 4, wherein said nonlinear optical medium presents second-order nonlinear optical effect, and said phase conjugate light is generated therefrom by optical parametric effect.

8. The optical fiber communication system according to claim 1, further comprising a loss-compensating light amplifier disposed in the middle of at least one of said first and second optical fibers.

9. The optical fiber communication system according to claim 8, wherein said light amplifier comprises plural in number, and the absolute values of the chromatic dispersion in the sections between said plurality of light amplifiers are gradually decreased in the direction or transmission.

10. The optical fiber communication system according to claim 1, further comprising: a transmitter connected operatively to said first optical fiber and generating said signal light by performing modulation on the basis of transmission data; and a receiver connected operatively to said second optical fiber and reproducing said transmission data by performing demodulation on the basis of said phase conjugate light.

11. The optical fiber communication system according to claim 10, further comprising a compensating third optical fiber disposed between said second optical fiber and said receiver.

12. The optical fiber communication system according to claim 8, wherein the wavelength of the light transmitted through said light amplifier is approximately equal to the gain peak wavelength of said light amplifier.

13. The optical fiber communication system according to claim 8, wherein said light amplifier comprises plural in number, said system further comprises a plurality of band pass filters for respectively eliminating spontaneous emission light noises caused in said plurality of light amplifier, and the respective pass bards of said plurality of band-pass filters become narrower in accordance with increase of the distance from said phase conjugator.

14. The optical fiber communication system according to claim 4, wherein the frequency of said signal light and the frequency of said pump light are set after fine adjustments executed in compliance with changes of the dispersion characteristics of said first and second optical fibers.

15. The optical fiber communication system according to claim 1, further comprising a transmitter which includes a means for generating said signal light by performing modulation on the basis of transmission data, wherein said transmitter includes said first optical fiber and said phase conjugator.

16. The optical fiber communication system according to claim 1, further comprising a receiver to perform demodulation on the basis of said phase conjugate light, wherein said receiver includes said phase conjugator and said second optical fiber.

17. The optical fiber communication system according to claim 1, further comprising at least one optical path which includes elements corresponding respectively to said first optical fiber, said phase conjugator and said second optical fiber; wherein said optical path is connected to the downstream side of said second optical fiber.

18. The optical fiber communication system according to claim 17, wherein said optical path further includes a light amplifier.

19. The optical fiber communication system according to claim 1, wherein said signal light is composed of a plurality of signal light beams of mutually different frequencies, and a plurality of said first optical fibers and a plurality of said phase conjugators are provided correspondingly to said plurality of signal light beams respectively, and a light multiplexer is further provided for combining the outputs of said plural phase conjugators and supplying the combined output to said second optical fiber.

20. The optical fiber communication system according to claim 1, wherein said signal light is composed of a plurality of signal light beams of mutually different frequencies, and a plurality of said first optical fibers are provided correspondingly to said plurality of signal light beams, and a light multiplexer is further provided for combining the outputs of said plural first optical fibers and supplying the combined output to said phase conjugator.

21. The optical fiber communication system according to claim 1, wherein the frequencies of said signal light and said phase conjugate light are so set that normal dispersion is caused in said first and second optical fibers.

22. The optical fiber communciation system according to claim 1, further comprising a polarization scrambler which acts on said signal light.

23. The optical fiber communication system according to claim 1, wherein said phase conjugator includes a nonlinear optical medium, a pump light source for generating pump light, and an optical means for supplying said pump light and said signal light to said nonlinear optical medium; and a polarization scrambler is further provided to act on said pump light.

24. A bidirectional optional fiber communication system equipped with an up circuit and a down circuit each having the optical fiber communication system defined in claim 1.

25. The bidirectional optical fiber communication system according to claim 24 wherein the frequency of the signal light in said down circuit and the frequency of the phase conjugate light in said up circuit are approximately equal to each other, and the frequency of the phase conjugate light in said down circuit and the frequency of the signal light in said up circuit are approximately equal to each other.

26. The bidirectional optical fiber communication system according to claim 24, further comprising a means for transferring a signal between said down circuit and said up circuit.

27. An optical fiber communication system comprising: a first optical fiber for transmitting a signal light therethrough; a phase conjugator for generating, in response to said signal light supplied from said optical fiber, phase conjugate light corresponding to said signal light; and a second optical fiber for transmitting said phase conjugate light supplied thereto from said phase conjugator; wherein the total wavelength dispersion in said first optical fiber is approximately equal to the total wavelength dispersion in said second optical fiber, and when at least one of said first and second optical fibers is virtually divided into a plurality of sections, the product of the optical frequency, the average signal light intensity, the nonlinear refractive index and the reciprocal of the average wavelength dispersion in each of said sections is substantially fixed.

28. The optical fiber communication system according to claim 27, wherein the product of the optical frequency, the average signal light intensity, the nonlinear refractive index and the fiber length in each of said sections is substantially fixed, and also the product of the average wavelength dispersion and the fiber length in each of said sections is substantially fixed.

29. The optical fiber communication system according to claim 27, further comprising a loss-compensating light amplifier diposed in the middle of at least one of said first and second optical fibers.

30. The optical fiber communication system according to claim 27, further comprising at least one optical path which includes elements corresponding respectively to said first optical fiber, said phase conjugator and said second optical fiber, wherein said optical path is connected to the downstream side of said second optical fiber.

31. The optical fiber applicable to said first or second optical fiber defined in claim 1.

32. The optical fiber according to claim 31, wherein the conditions defined in claim 1 are substantially satisfied by fusing and mutually splicing a pluarlity of fibers.

33. The optical fiber according to claim 31, wherein the conditions defined in claim 1 are substantially satisfied by continuously changing, in the longitudinal direction, at least one of the fiber parameters selected from the loss, nonlinear refractive index, mode field diameter and dispersion.

34. An optical fiber applicable to said first or second optical fiber defined in claim 27.

35. The optical fiber according to claim 34, wherein the conditions defined in claim 34 are substantially satisfied by fusing and mutually splicing a plurality of fibers.

36. The optical fiber according to claim 34, wherein the conditions defined in claim 34 are substantially satisfied by continuously changing, in the longitudinal direction, at least one of the fiber parameters selected from the loss, nonlinear refractive index, mode field diameter and dispersion.

* * * * *